(12) United States Patent
Takao

(10) Patent No.: US 10,872,434 B2
(45) Date of Patent: Dec. 22, 2020

(54) IMAGE PROCESSING APPARATUS AND METHOD

(71) Applicant: SONY CORPORATION, Tokyo (JP)

(72) Inventor: Yoshiyuki Takao, Tokyo (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 16/085,707

(22) PCT Filed: Mar. 10, 2017

(86) PCT No.: PCT/JP2017/009671
§ 371 (c)(1),
(2) Date: Sep. 17, 2018

(87) PCT Pub. No.: WO2017/163928
PCT Pub. Date: Sep. 28, 2017

(65) Prior Publication Data
US 2019/0122383 A1 Apr. 25, 2019

(30) Foreign Application Priority Data

Mar. 24, 2016 (JP) .................................. 2016-059980

(51) Int. Cl.
*G06T 7/73* (2017.01)
*H04N 9/31* (2006.01)
(Continued)

(52) U.S. Cl.
CPC .............. *G06T 7/74* (2017.01); *G06K 9/6202* (2013.01); *G06K 9/6215* (2013.01);
(Continued)

(58) Field of Classification Search
CPC ............. G06T 7/74; G06T 2207/20076; G06T 2207/20224; G06T 2207/30244;
(Continued)

(56) References Cited

U.S. PATENT DOCUMENTS

2003/0128337 A1 7/2003 Jaynes et al.
2008/0112592 A1* 5/2008 Wu ....................... A61B 5/1113
382/103
(Continued)

FOREIGN PATENT DOCUMENTS

JP 2016-014720 A 1/2016

OTHER PUBLICATIONS

Johnson, et al., "A Distributed Cooperative Framework for Continuous Multi-Projector Pose Estimation", IEEE Virtual Reality Conference 2009, Mar. 14-18, 2009, pp. 35-42.
(Continued)

*Primary Examiner* — Syed Haider
(74) *Attorney, Agent, or Firm* — Chip Law Group

(57) ABSTRACT

Provided is an image processing apparatus and a method to improve the robustness of posture estimation during viewing of contents with respect to a projected image. Similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit, is evaluated, and a posture of the projection unit or the imaging unit or postures of both of the projection unit and the imaging unit on the basis of an evaluation result of the similarity are set.

18 Claims, 22 Drawing Sheets

(51) Int. Cl.
*G06K 9/62* (2006.01)
*H04N 5/247* (2006.01)

(52) U.S. Cl.
CPC ............ *G06K 9/6255* (2013.01); *H04N 5/247* (2013.01); *H04N 9/3129* (2013.01); *H04N 9/3147* (2013.01); *H04N 9/3185* (2013.01); *H04N 9/3194* (2013.01); *G06T 2207/30244* (2013.01)

(58) Field of Classification Search
CPC .. G06K 9/6255; G06K 9/6215; G06K 9/6202; G06K 9/3275; H04N 9/3147; H04N 9/3185; H04N 5/232; H04N 9/3194; H04N 5/247; H04N 9/3129
See application file for complete search history.

(56) References Cited

U.S. PATENT DOCUMENTS

| | | | | |
|---|---|---|---|---|
| 2008/0228433 A1* | 9/2008 | Meyer | ................... | G06T 7/70 702/150 |
| 2012/0069968 A1* | 3/2012 | Core | ................... | A61N 5/1049 378/206 |
| 2013/0272578 A1* | 10/2013 | Watanabe | ........... | G06K 9/00201 382/103 |
| 2015/0208052 A1* | 7/2015 | Kobiki | ................. | H04N 5/2628 348/578 |

OTHER PUBLICATIONS

Ashdown, et al., "Steerable Projector Calibration", Proceedings of the 2005, IEEE Computer Society Conference on Computer Vision and Pattern Recognition (CVPR'05), 10 pages.

Johnson, et al., "A Distributed Cooperative Framework for Continuous Multi-Projector Pose Estimation", Apr. 7, 2009, pp. 35-42.

Ashdown, et al., "Steerable Projector Calibration", IEEE Computer Society Conference on Computer Vision and Pattern Recognition (CVPR'05)—Workshops, Sep. 21-23, 2005, 08 pages.

International Search Report and Written Opinion of PCT Application No. PCT/JP2017/009671, dated May 21, 2017, 09 pages of ISRWO.

Ashdown, et al., "Steerable Projector Calibration", Proceedings of the 2005 IEEE Computer Society Conference on Computer Vision and Patttem Recognition (CVPR'05), 10 pages.

Johnson, et al., "A Distributed Cooperative Framework for Continuous Multi-Projector Pose Estimation", IEEE Virtual Reality 2009, Lafayette, Louisiana, USA, Mar. 14-18, 2009, 10 pages.

Gordon, et al., "What and Where: 3D Object Recognition with Accurate Pose", International Symposium on Mixed and Augmented Reality, 2004, 16 pages.

* cited by examiner

```
for (loopIndex == 0; loopIndex < 4; loopIndex++) {
    if (loopIndex < 2) {
        Bundle Adjustment TO PERFORM MATCHING OF ENTIRE IMAGE AT
REDUCED SIZE
    } else if (loopIndex == 2) {
        Bundle Adjustment TO PERFORM MATCHING OF ENTIRE SCREEN AT ORIGINAL SIZE
    } else if (loopIndex == 3) {
        Bundle Adjustment LIMITING MATCHING RANGE IN CONSIDERATION OF INFLUENCE
OF EDGE
    }
}
```

IMAGE PROCESSING APPARATUS AND METHOD

CROSS REFERENCE TO RELATED APPLICATIONS

This application is a U.S. National Phase of International Patent Application No. PCT/JP2017/009671 filed on Mar. 10, 2017, which claims priority benefit of Japanese Patent Application No. JP 2016-059980 filed in the Japan Patent Office on Mar. 24, 2016. Each of the above-referenced applications is hereby incorporated herein by reference in its entirety.

TECHNICAL FIELD

The present disclosure relates to an image processing apparatus and a method, and in particular to an image processing apparatus and a method that can improve the robustness of posture estimation during viewing of contents with respect to a projected image.

BACKGROUND ART

Conventionally, to reduce distortion of a projected image projected by a projector and to position projected images by a plurality of projectors, there is a method of imaging the projected image by a camera, estimating the position, posture, projection surface shape, and the like of the projector, using the captured image, and performing geometric correction of the projected image according to the estimation.

As a method of estimating the position, posture, and the like of the projector at that time, a method using a characteristic amount of an image such as contents in projection has been conceived (for example, see Non-Patent Document 1).

CITATION LIST

Non-Patent Document

Non-Patent Document 1: David G. Lowe, "What and Where: 3D Object Recognition with Accurate Pose", 2006

SUMMARY OF THE INVENTION

Problems to be Solved by the Invention

However, in this method, performance of the posture estimation is heavily dependent on the projected image, and if a large number of characteristic points cannot be extracted from the projected image or positions of the extracted characteristic points are biased, the posture estimation becomes difficult.

The present disclosure has been made in view of such a situation, the robustness of posture estimation during viewing of contents with respect to a projected image is improved.

Solutions to Problems

An image processing apparatus of one aspect of the present technology is an image processing apparatus including a similarity evaluation unit configured to evaluate similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit, and a posture setting unit configured to set a posture of the projection unit or the imaging unit or postures of both of the projection unit and the imaging unit as an estimation result on the basis of an evaluation result of the similarity by the similarity evaluation unit.

The posture setting unit can set the posture of the projection unit or the imaging unit or the postures of both of the projection unit and the imaging unit as the estimation result, the postures having been evaluated to have the optimum similarity by the similarity evaluation unit.

The similarity evaluation unit can obtain a sum of differences in absolute values of luminance values of pixels between the simulation image and the captured image, as an evaluation value indicating the similarity, and the posture setting unit can set the posture of the projection unit or the imaging unit or the postures of both of the projection unit and the imaging unit, the postures having the minimum evaluation value, as the estimation result.

The similarity evaluation unit can obtain a sum of squares of differences in luminance values of pixels between the simulation image and the captured image, as an evaluation value indicating the similarity, and the posture setting unit can set the posture of the projection unit or the imaging unit or the postures of both of the projection unit and the imaging unit, the postures having the minimum evaluation value, as the estimation result.

The similarity evaluation unit can obtain normalized cross-correlation between the simulation image and the captured image, as an evaluation value indicating the similarity, and the posture setting unit can set the posture of the projection unit or the imaging unit or the postures of both of the projection unit and the imaging unit, the postures having the maximum evaluation value, as the estimation result.

The similarity evaluation unit can obtain zero-mean normalized cross-correlation between the simulation image and the captured image, as an evaluation value indicating the similarity, and the posture setting unit can set the posture of the projection unit or the imaging unit or the postures of both of the projection unit and the imaging unit, the postures having the maximum evaluation value, as the estimation result.

The similarity evaluation unit can set a virtual posture of the projection unit or the imaging unit or virtual postures of both of the projection unit and the imaging unit, generate the simulation image obtained at the virtual posture, and evaluate the similarity between the captured image and the simulation image.

The similarity evaluation unit can generate the simulation image with a luminance value or a predetermined color component.

The similarity evaluation unit can evaluate the similarity between a reduced image of the captured image and the simulation image.

The similarity evaluation unit can evaluate the similarity between a partial image in a predetermined range that is an object to be processed, of the captured image, and the simulation image.

The similarity evaluation unit can repeat evaluation of the similarity a plurality of times.

The similarity evaluation unit can evaluate the similarity of each time, making a resolution of the captured image, or a range of a partial image that is an object to be processed in the captured image variable.

A corresponding point distance evaluation unit configured to obtain corresponding points between the captured image and the simulation image, and evaluate a distance between the corresponding points between the captured image and the simulation image can be further included.

Both of the evaluation of the distance between the corresponding points by the corresponding point distance evaluation unit and the evaluation of the similarity by the similarity evaluation unit can be performed, and the posture setting unit can set the posture of the projection unit or the imaging unit or the postures of the projection unit and the imaging unit as the estimation result on the basis of both of an evaluation result of the distance between the corresponding points by the corresponding point distance evaluation unit and the evaluation result of the similarity by the similarity evaluation unit.

Either the evaluation of the distance between the corresponding points by the corresponding point distance evaluation unit or the evaluation of the similarity by the similarity evaluation unit can be performed, and the posture setting unit can set the posture of the projection unit or the imaging unit or the postures of the projection unit and the imaging unit as the estimation result on the basis of an evaluation result of the distance between the corresponding points by the corresponding point distance evaluation unit or the evaluation result of the similarity by the similarity evaluation unit.

The similarity evaluation unit can evaluate the similarity between the captured image and the simulation image between each of a plurality of the projection units and each of a plurality of the imaging units, and the posture setting unit can set the postures of the plurality of projection units or the plurality of imaging units, or the postures of both of the plurality of projection units and the plurality of imaging units, as the estimation result, on the basis of evaluation results of the similarity between each of the projection units and each of the imaging units by the similarity evaluation unit.

A setting unit configured to perform setting regarding geometric correction of the projected image on the basis of the posture set by the posture setting unit can be further included.

The projection unit configured to project the projected image can be further included.

The imaging unit configured to capture the projected image to obtain the captured image can be further included.

An image processing method of one aspect of the present technology is an image processing method including evaluating similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit, and setting a posture of the projection unit or the imaging unit or postures of both of the projection unit and the imaging unit on the basis of an evaluation result of the similarity.

In the image processing apparatus and method of one aspect of the present technology, similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit, is evaluated, and a posture of the projection unit or the imaging unit or postures of both of the projection unit and the imaging unit on the basis of an evaluation result of the similarity are set.

Effects of the Invention

According to the present disclosure, an image can be processed. In particular, the robustness of posture estimation during viewing of contents with respect to a projected image can be improved.

MODE FOR CARRYING OUT THE INVENTION

Figure 1:
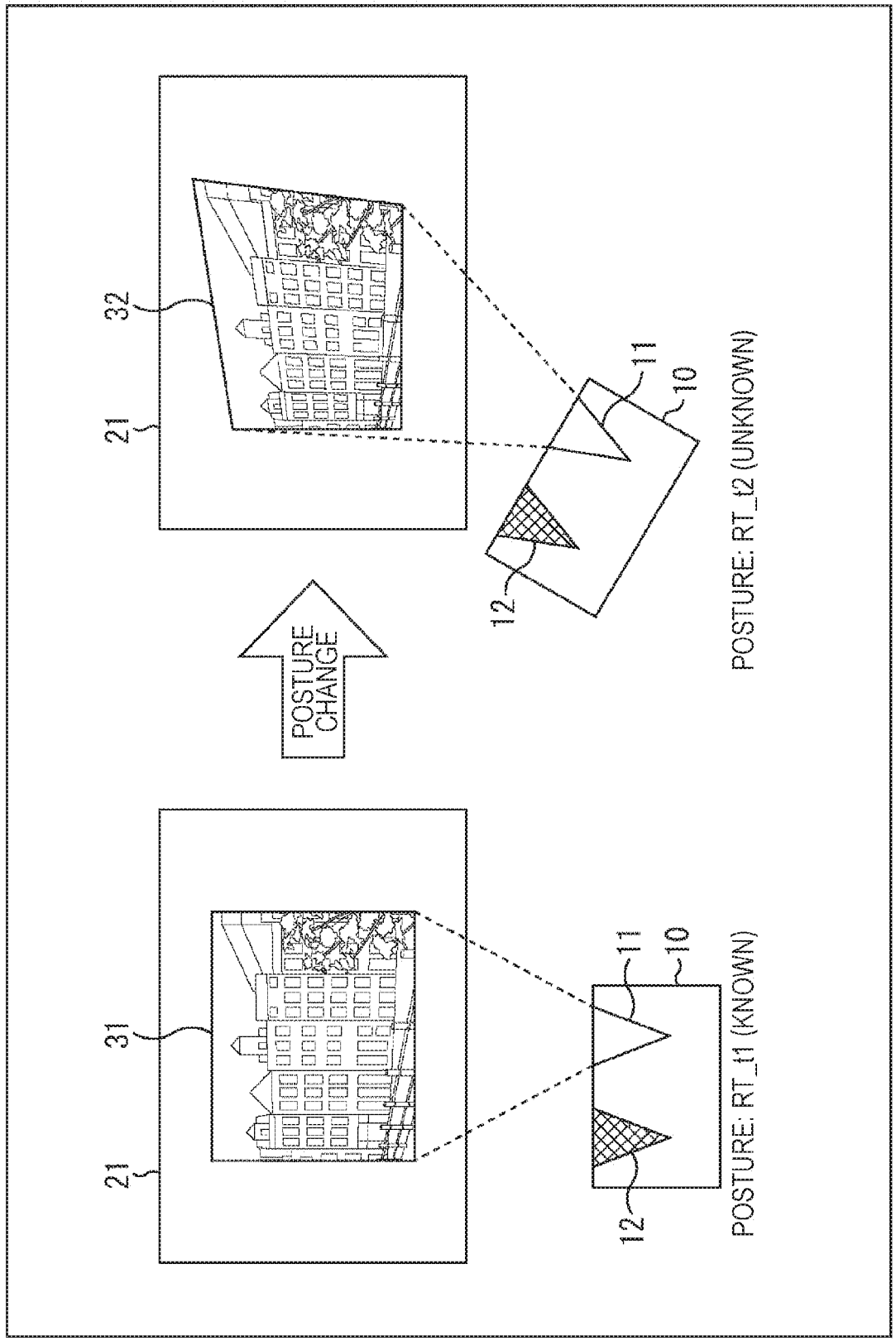
FIG. 1 is a diagram illustrating an example of a state of posture change.

Hereinafter, a mode for implementing the present disclosure (hereinafter referred to as embodiment) will be described. Note that the description will be given in the following order.

1. Posture estimation using image similarity
2. First embodiment (projection imaging system)
3. Second Embodiment (posture estimation unit)
4. Third embodiment (projection imaging system/projection imaging device)
5. Others

1. Posture Estimation Using Image Similarity

<Geometric Correction>

A projected image may be distorted and difficult to see due to a posture (a position, a direction, or the like) of a projector with respect to a projection surface (a screen, a wall or the like), a shape of the projection surface, and the like. In such a case, the distortion of the projected image can be decreased and the projected image can be made easy to see by applying geometric correction such as correction of the distortion to the image projected by the projector.

There is also a system that projects an image by a plurality of projectors to form one projected image. For example, there is a method of realizing a high dynamic range by increasing a contrast ratio by projecting images at the same position from the plurality of projectors. Further, for example, there is also a method of realizing a large projected image than a projected image projected by one projector (a projected image with a higher resolution than a projected image projected by one projector) by arranging projected images projected from the projectors. In these methods, not only the above-described distortion correction for each projected image but also correction of positioning (shift, zoom, and the like) among the projected images is sometimes necessary. In addition, correction to make brightness, color, and the like uniform among the projected images is needed in some cases.

In the present specification, correction of changing the position of each pixel on the projection surface, of the projected image, such as deformation, movement, enlargement, and reduction of the projected image, is referred to as geometric correction. That is, the "geometric correction" includes not only correction based on image processing but also correction based on control of an optical system such as shift and zoom, correction based on control of a posture or the like of a projection unit, and the like. Further, in the present specification, the "posture" of a projection unit, an imaging unit, or the like includes not only an "orientation" of the projection unit or the imaging unit (an orientation of projection or imaging) but also a "position" of the projection unit or the imaging unit (a position where the projection or imaging is performed).

Such geometric correction can be manually performed by an operator or the like who operates the projector, but the operator may be required to perform complicated work. In view of this, a method of imaging the projected image projected by the projector using a camera, and setting the geometric correction using the captured image has been conceived. In this case, postures of the camera and the projector, a screen shape, and the like are estimated from the projected image included in the captured image, and appropriate geometric correction is set according to the estimation.

<Online Sensing>

Such geometric correction setting may be required not only before the projection of contents (moving image) but also during the projection of the contents. For example, assuming that the posture of a projection imaging device 10 (projection unit 11) is in the state as illustrated on the left side in FIG. 1 at the time when the projection of the contents (moving image) is started. Before starting the projection of the content (moving image), the projection imaging device 10 projects an image from the projection unit 11 toward a screen 21, images a projected image 31 by the imaging unit, and performs posture estimation of the projection imaging device 10 (the projection unit 11 and the imaging unit 12) and reconstruction (shape estimation) of the screen 21, using the obtained captured image, and sets the geometric correction on the basis of the estimation. That is, a posture (RRT_t1) at the time when the projection of the contents (moving image) of the projection imaging device 10 is started is known, and the geometric correction according to the posture is applied to the projected image 31.

When the posture of the projection imaging device 10 changes during the projection of the contents (moving image), setting of the geometric correction does not correspond to the posture of the projection imaging device 10, and distortion occurs in the projected image, as in a projected image 32 illustrated on the right side in FIG. 1. Since the posture (RT_t2) after the change is unknown, the posture of the projection imaging device 10 needs to be estimated again to appropriately set the geometric correction.

However, suspension of the projection of the contents (moving image) for that reason is undesirable for a user who is viewing the contents because the suspension disturbs the viewing of the contents. Therefore, a method (online sensing) of detecting corresponding points while continuing the projection of contents has been conceived.

As an online sensing technology, a system to use an image characteristic amount of the contents (moving image) on projection has been conceived, for example. For example, a method of respectively obtaining image characteristic amounts from a plurality of images using SIFT (Non-Patent Document 1) and performing posture estimation from corresponding points of the image characteristic amounts has been conceived.

<Posture Estimation by Distance between Corresponding Points>

Figure 2:
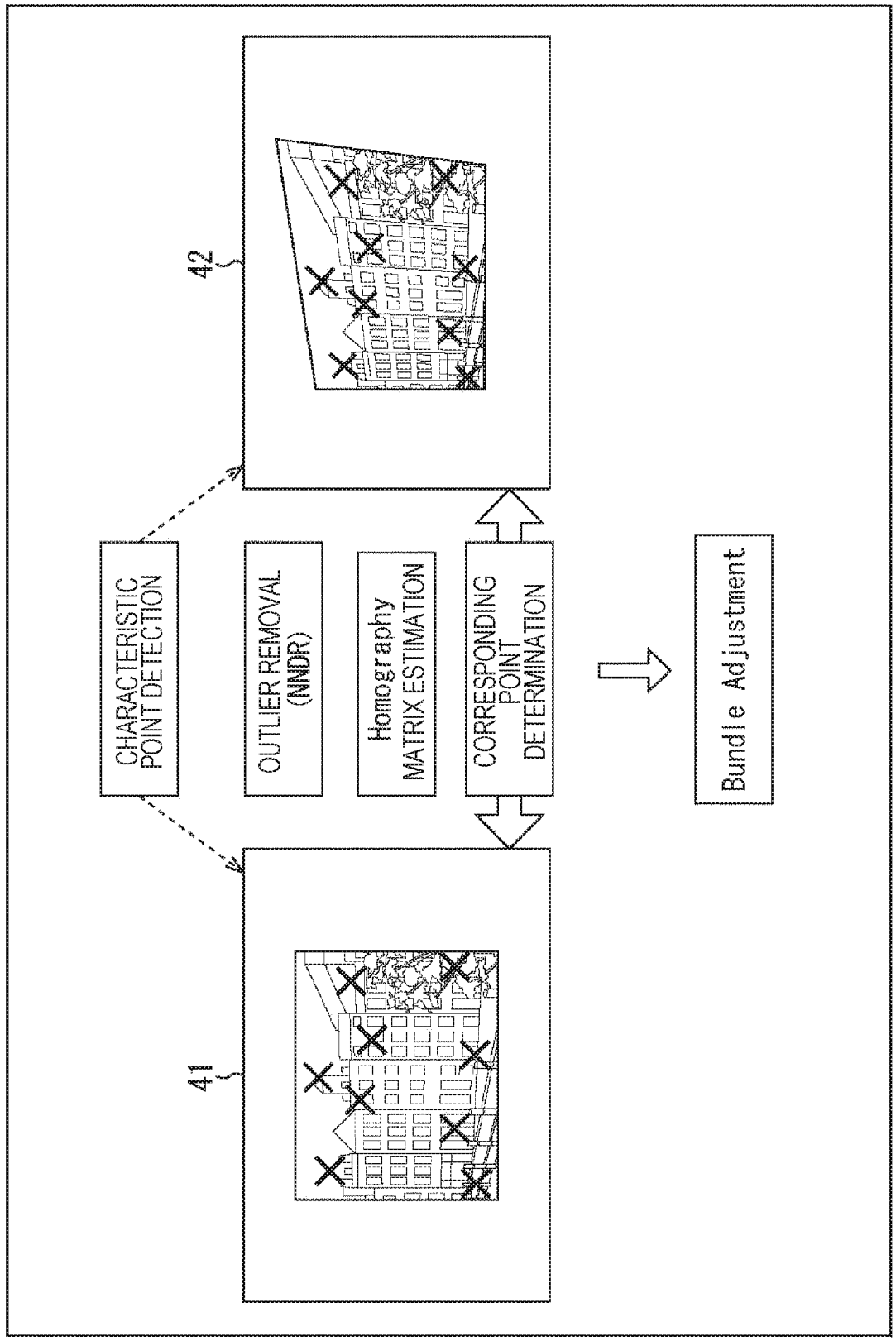
FIG. 2 is a diagram illustrating an example of a posture estimation method.

For example, when the posture of the projection imaging device 10 changes as in the example of FIG. 1, the projection imaging device 10 images the projected image 32 by the imaging unit 12 and obtains a captured image 42 as illustrated on the right side in FIG. 2. That is, the captured image 42 includes the projected image 32. Then, the projection imaging device 10 detects a portion having a predetermined characteristic amount as a characteristic point (X mark in FIG. 2) from a portion of the projected image 32 included in the captured image 42. Further, the projection imaging device 10 generates a simulation image 41 simulating a captured image supposed to be obtained in a case where the same image is projected by the projection unit 11 and imaged by the imaging unit 12 at the known posture RT_t1, as illustrated on the left side in FIG. 2. That is, the simulation image 41 includes the projected image 31. Then, the projection imaging device 10 detects a portion having a predetermined characteristic amount as a characteristic point (X mark in FIG. 2) from a portion of the projected image 31 included in the simulation image 41.

The projection imaging device 10 performs outlier removal (nearest neighbor distance ratio (NNDR)), nomography matrix estimation (projective transformation matrix estimation), and the like, and obtains a correspondence relationship between the characteristic point included in the simulation image 41 and the characteristic point included in the captured image 42, and detects characteristic points corresponding to each other (also referred to as corresponding points).

Figure 3:
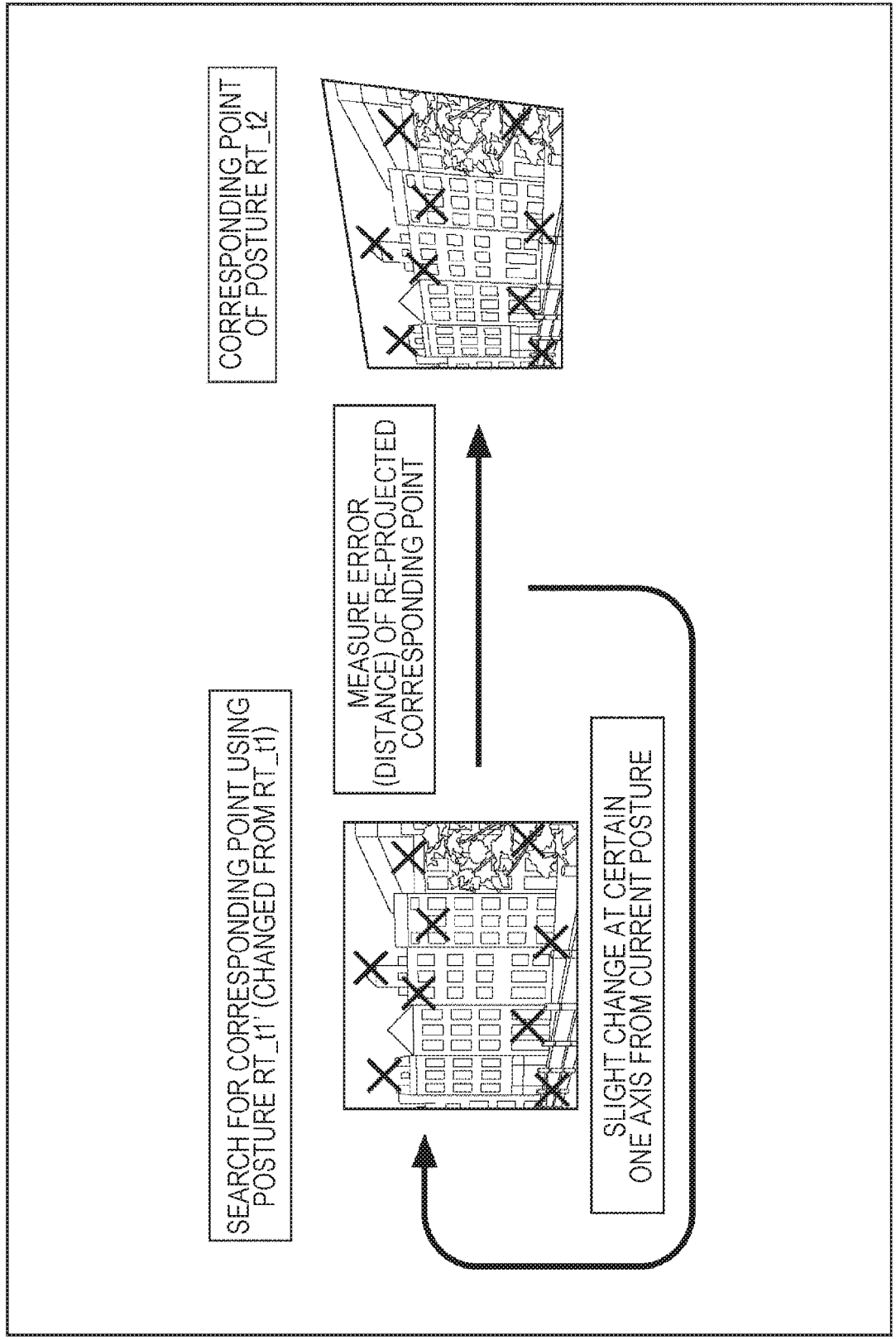
FIG. 3 is a diagram illustrating an example of the posture estimation method.
Figure 4:
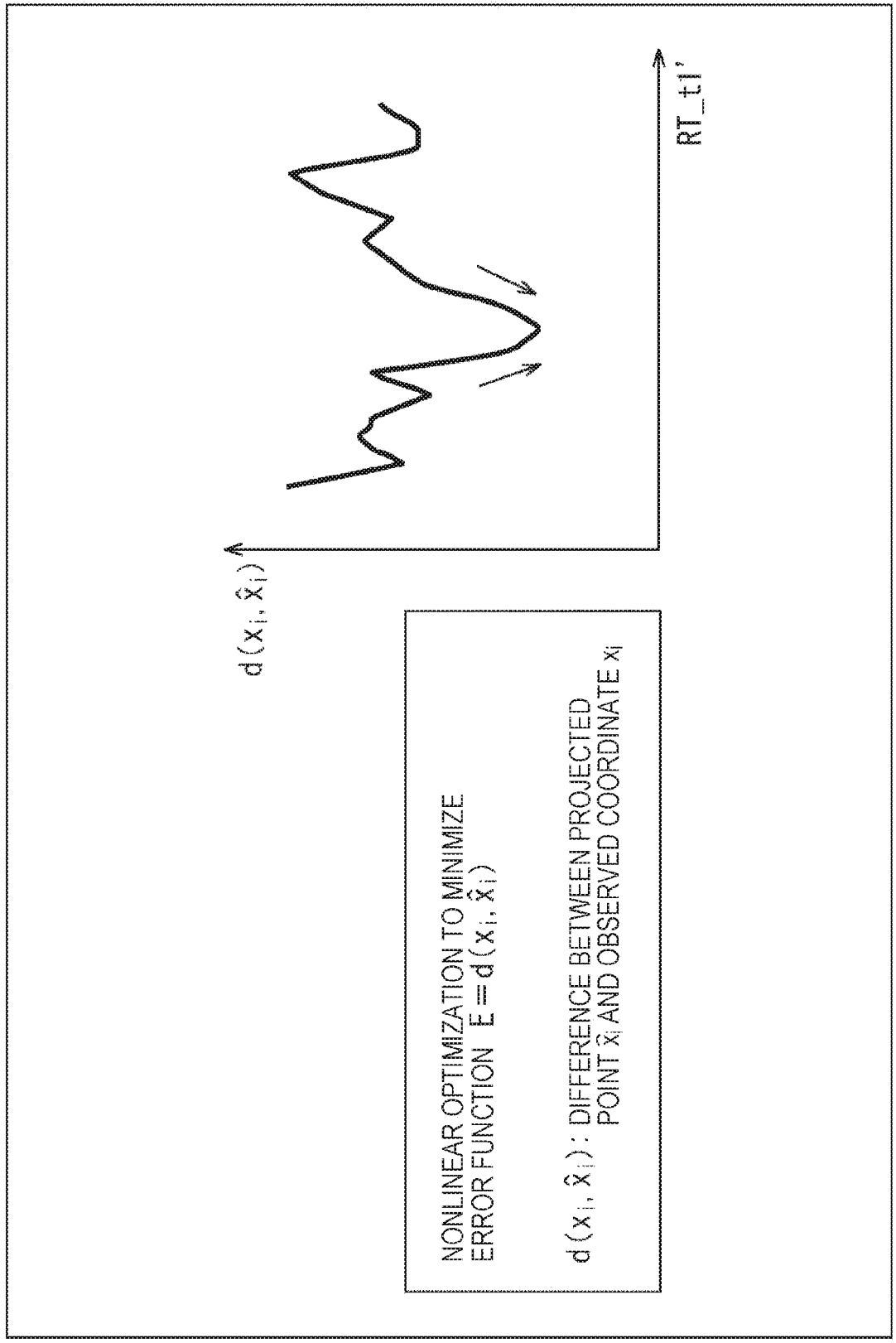
FIG. 4 is a diagram illustrating an example of a state of bundle adjustment.

When obtaining the corresponding points, the projection imaging device 10 optimizes an error function E using a distance between the corresponding points by bundle adjustment. The bundle adjustment is a nonlinear optimization technique for minimizing the error function E. For example, as illustrated in FIG. 3, the posture of the projection imaging device 10 is virtually slightly changed, a simulation image is generated at a virtual posture RT_t1', and the corresponding points of the characteristic points are obtained between the simulation image and the captured image 42, and the error function E is obtained. Such processing is repeated with the known posture RT_t1 as an initial value, and a virtual posture RT_t1' at which the error function E becomes minimum is obtained as illustrated in FIG. 4. The virtual posture RT_t1' at which the error function E becomes minimum is a posture closest to a current posture RT_t2, and ideally the virtual posture RT_t1' coincides with the current posture RT_t2. Therefore, the setting of the geometric correction according to the virtual posture RT_t1' becomes optimum setting for the current posture RT_t2, and the distortion of the projected image 32 can be most reduced.

<Image with Few Characteristic Points>

Figure 5:
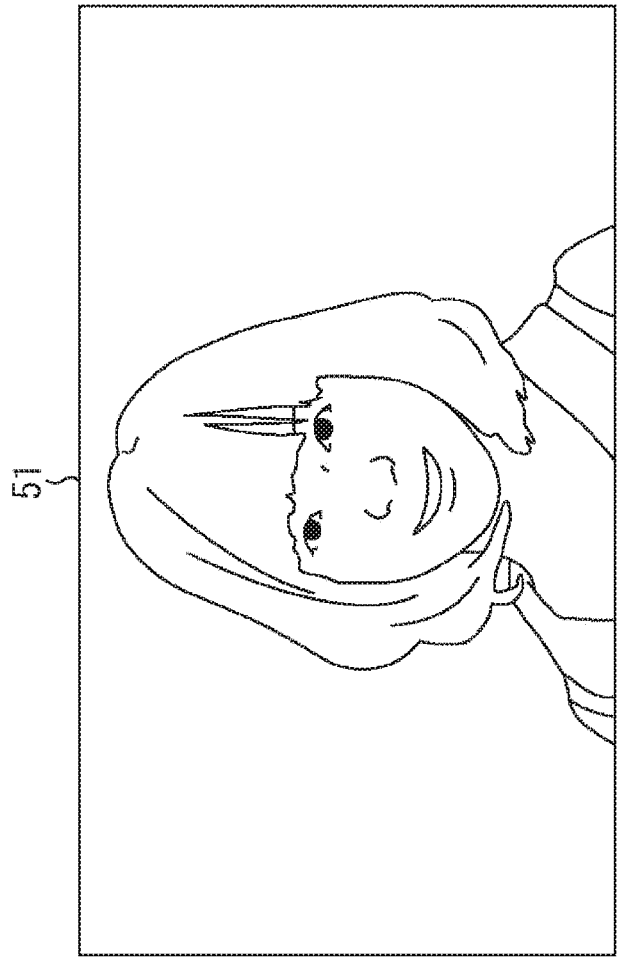
FIG. 5 is a diagram illustrating an example of a projected image.

However, in the case of an image having a shallow depth of field, for example, there are many so-called blurred areas. Detection of the characteristic point is difficult in places having few edges such as the blurred areas. Further, for example, since the background of a projected image 51 illustrated in FIG. 5 is plain, detection of the characteristic point is difficult in the background part, similarly to the blurred area. That is, such an image having a shallow depth of field or an image in which the plain background occupies a large portion have a small number of the characteristic points. In the case of such images with the small number of characteristic points, the number of corresponding points may also be decreased. As described above, since the error function E is calculated using the distance between corresponding points, there has been a possibility of reduction of the accuracy of the posture estimation unless the number of corresponding points is sufficient.

Further, for example, the projected image 51 illustrated in FIG. 5 has a composition in which a person is positioned in the center and the other portion is the background (plain). The image having a shallow depth of field is also a common composition. However, in such a composition, the edges are biased to a part of the image. Therefore, the characteristic points are also biased to a part of the image. In the case of the composition of the projected image 51 illustrated in FIG. 5, there is a high possibility that the characteristic points are biased towards the vicinity of the center of the image (the portion of the person). If the characteristic points are biased to a part of the image (especially the center part), the corresponding points are also biased to the part, and there has been a possibility that grasp of a tendency of distortion of the entire image from the corresponding points becomes difficult. That is, there has been a possibility that more accurate posture estimation becomes difficult.

Figure 6:
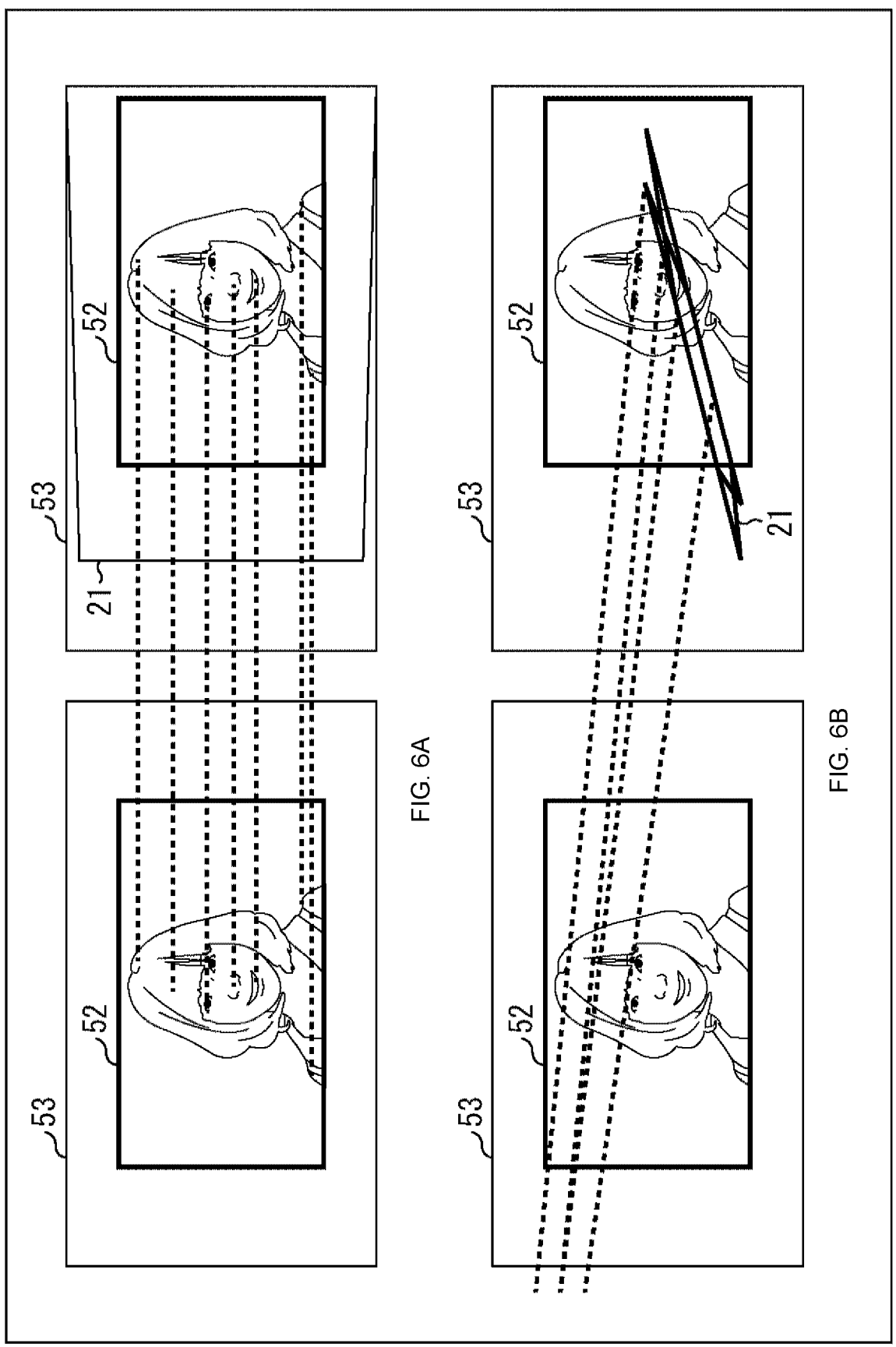
FIGS. 6A and 6B are diagrams illustrating an example of a state of posture estimation.

For example, as illustrated in FIG. 6A, assume that the position of a projected image 52 in a captured image 53 is shifted from the vicinity of the center (the state on the left side in FIG. 6A) to a right side (the state on the right side in FIG. 6A) due to posture change of the projection imaging device. If a sufficient number of characteristic points are obtained in a wide area of the projected image 52, a sufficient number of corresponding points can be obtained as illustrated by the dotted lines, and accurate posture estimation can be performed from the corresponding points and the posture (shape) of the screen 21 after posture change can also be accurately estimated.

In contrast, as illustrated in the example of FIG. 6B, in the case where a sufficient number of characteristic points cannot be obtained in the projected image 52, there has been a possibility that obtainment of the correspondence relationship becomes difficult between before and after posture change (between the state on the left side and the state on the right side in FIG. 6B), as illustrated by the dotted lines. Therefore, accurate posture estimation becomes difficult, and there has been a possibility that accurate estimation becomes difficult because the posture (shape) of the screen 21 after the posture change is crushed, for example, as in the example on the right side in FIG. 6B.

As described above, the accuracy of the conventional posture estimation by the error function E using the distance between the corresponding points depends on characteristics of an image, and obtainment of sufficient accuracy is sometimes difficult depending on an image.

<Posture Estimation by Image Similarity>

Therefore, similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit, is evaluated, and a posture of the projection unit or the imaging unit or postures of both of the projection unit and the imaging unit are set as an estimation result on the basis of an evaluation result. That is, matching of images themselves (similarity evaluation) is performed instead of using the corresponding points.

By doing this, dependency of posture estimation accuracy on a characteristic of a projected image can be suppressed. That is, the robustness of posture estimation during viewing of contents with respect to a projected image can be improved.

<Virtual Posture>

In the evaluation of the similarity, the virtual posture of the projection unit or the imaging unit or the virtual postures of both of the projection unit and the imaging unit are set, the simulation image obtained at the virtual posture is generated, and the similarity between the captured image obtained at an actual posture and the simulation image may be evaluated.

Figure 7:
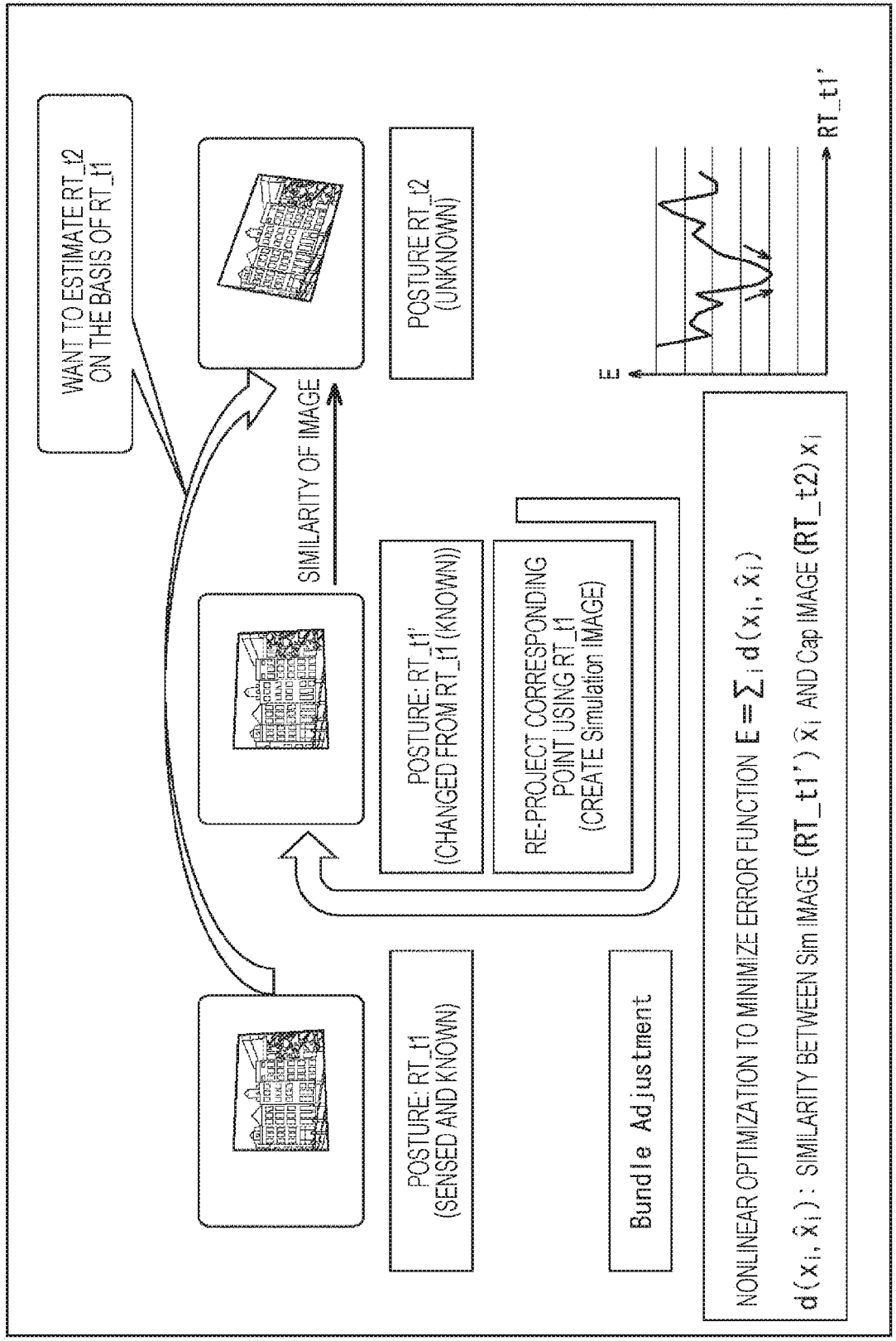
FIG. 7 is a diagram illustrating an example of the posture estimation method.

For example, as illustrated in FIG. 7, assume that the posture of the projection unit or the imaging unit, or both of the postures of the projection unit and the imaging unit are changed from the sensed and known posture (RT_t1) to the unknown posture (RT_t2). In this case, the similarity between the simulation image at the virtual posture (RT_t1') and the captured image at the unknown posture (RT_t2) may be evaluated.

By use of the simulation image at the virtual posture in this way, it is not necessary to actually change the posture, and posture estimation can be easily performed.

<Simulation Image>

Note that the simulation image may be generated with a luminance value or a predetermined color component. The simulation image only needs to include information necessary for the posture estimation, and it is not necessary to simulate all the information included in the captured image. For example, in calculation of the similarity, only the luminance values may be compared or only predetermined color components may be compared. That is, in generating the simulation image, image processing such as grayscale conversion may be performed, for example. By appropriately limiting the amount of information, an increase in the amount of information of the simulation image is suppressed, and an increase in a load of processing of evaluation of the similarity can be suppressed.

<Optimum Evaluation Search Technique>

Further, in the posture estimation, a plurality of the simulation images is generated while changing the posture of the projection unit or the imaging unit or both of the postures of the projection unit and the imaging unit, each simulation image and the captured image are compared and the similarity is obtained, and the (virtual) posture estimated to have the optimum similarity may be set as the estimation result. For example, in the case of FIG. 7, the virtual posture (RT_t1') is repeatedly set while slightly changing the posture with the known posture (RT_t1) as an initial value. Then, the similarity between the simulation image at each posture and the captured image at the unknown posture (RT_t2) is evaluated, and the virtual posture (RT_t1') evaluated to be optimum in the estimation may be used as the estimation result.

By doing this, the posture estimation can be more accurately performed.

<Similarity Evaluation Using Error Function>

The method of evaluating the similarity between the captured image and the simulation image is arbitrary. For example, as illustrated in FIG. 7, an error function (evaluation function) E may be calculated from the similarity between the captured image and the simulation image, and the similarity may be evaluated by the value of the error function E. For example, the value of the error function E becoming minimum may be evaluated to be optimum, and the virtual posture (RT_t1') at which the value of the error function E becomes minimum may be used as the estimation result.

<Matching Per Pixel>

Further, the method of calculating the similarity between the captured image and the simulation image is also arbitrary. For example, the captured image and the simulation image are compared for each pixel (matching is performed for each pixel), the similarity between pixels is calculated, and the similarity between the images (the similarity as the images) may be calculated using the similarity between the pixels. For example, the similarity between pixels may be obtained using pixel values of the pixels of the images.

<Similarity Calculation Using Function>

For example, the similarity between the images may be calculated from pixel values of pixels of the captured image and the simulation image using a predetermined function. This function is arbitrary. For example, a function such as sum of absolute difference (SAD), sum of square difference (SSD), normalized cross-correlation (NCC), or zero-means normalized cross-correlation (ZNCC) may be used. These functions will be described below.

Note that, in this description of the functions, the luminance value of the pixel at the position (i, j) of the simulation (Simulation) image, the average of the luminance values of the pixels of the simulation image, the luminance value of the pixel at the position (i, j) of the captured (Capture) image, and the average of the luminance values of the pixels of the captured (Capture) image are determined as shown in the following expressions (1).

[Expression 1]

$SimY(i,j)$: The luminance value at the position $(i,j)$ of Simulation image $\overline{SimY}$: The average of the luminance values of Simulation image $CapY(i,j)$: The luminance value at the position $(i,j)$ of Captured image $\overline{CapY}$: The average of the luminance values of Captured image (1)

FUNCTION EXAMPLE 1: SAD

For example, a sum of absolute differences (SAD) in the pixel values of the pixels of the images may be employed as the similarity. This SAD is calculated by, for example, the following expression (2). The smaller the SAD, the higher the similarity between the images.

[Expression 2]

$$SAD = \sum_{j=0}^{height-1} \sum_{i=0}^{width-1} (SimY(i,j) - CapY(i,j)) \quad (2)$$

FUNCTION EXAMPLE 2: SSD

For example, a sum of square differences (SAD) in the pixel values of the pixels of the images may be employed as the similarity. This SSD is calculated by, for example, the following expression (3). The smaller the SSD, the higher the similarity between the images.

[Expression 3]

$$SSD = \sum_{j=0}^{height-1} \sum_{i=0}^{width-1} (SimY(i,j) - CapY(i,j))^2. \quad (3)$$

FUNCTION EXAMPLE 3: NCC

For example, normalized cross-correlation (NCC) may be employed as the similarity. This NCC is calculated by, for example, the following expression (4). A value range of this NCC is $0 \leq NCC \leq 1$, and the larger the value (the closer the value is to "1"), the higher the similarity between the images.

[Expression 4]

$$NCC = \frac{\sum_{j=0}^{height-1} \sum_{i=0}^{width-1} SimY(i,j)CapY(i,j)}{\sqrt{\sum_{j=0}^{height-1} \sum_{i=0}^{width-1} SimY(i,j)^2} \times \sqrt{\sum_{j=0}^{height-1} \sum_{i=0}^{width-1} CapY(i,j)^2}}. \quad (4)$$

FUNCTION EXAMPLE 4: ZNCC

For example, the zero mean normalized cross-correlation (ZNCC) may be employed as the similarity. This ZNCC is calculated by, for example, the following expression (5).

[Expression 5]

$$ZNCC = \frac{\sum_{j=0}^{height-1} \sum_{i=0}^{width-1} ((SimY(i,j) - \overline{SimY})(CapY(i,j) - \overline{CapY}))}{\sqrt{\sum_{j=0}^{height-1} \sum_{i=0}^{width-1} (SimY(i,j) - \overline{SimY})^2} \times \sqrt{\sum_{j=0}^{height-1} \sum_{i=0}^{width-1} (CapY(i,j) - \overline{CapY})^2}} \quad (5)$$

A value range of this ZNCC is expressed by the following expression (6), and the larger the value (the closer the value is to "1"), the higher the similarity between the images.

[Expression 6]

$$-1 \leq ZNCC \leq 1 \quad (6)$$

<Error Function E>

Further, the error function E using such functions may be any function. For example, the function may be a function like the expression (7) below.

[Expression 7]

$$E = -1 * ZNCC + 1 \quad (7)$$

In this case, a value range of the error function E is expressed by the following expression (8), and the smaller the value, the higher the evaluation (that is, the higher the similarity).

[Expression 8]

$$0 \leq E \leq 2 \quad (8)$$

<Similarity Evaluation Using Reduced Image>

Note that the similarity between the captured image and the simulation image may be evaluated using reduced images. That is, matching may be performed between a reduced image of the captured image and a reduced image of the simulation image (that is, the simulation image having the same resolution as the reduced image of the captured image). Since the resolution (the number of pixels) is reduced by use of the reduced images, matching (calculation of the similarity) becomes easier, but the area per pixel becomes wider. That is, the accuracy of the posture estimation becomes coarse, in other words, the amount of movement in a case where one pixel is shifted becomes large, and thus the posture estimation can be performed faster. Therefore, for example, also in the case where posture change is large (for example, in the case where the amount of movement of the projected image is large), the posture estimation can be performed faster.

<Similarity Evaluation Using Partial Image>

Further, matching may be performed (the similarity may be evaluated) between the simulation image and a partial image in a predetermined range that is an object to be processed of the captured image. That is, the predetermined range of the captured image is set as the object to be processed, and matching may be performed within the range that is the object to be processed.

Figure 8A:
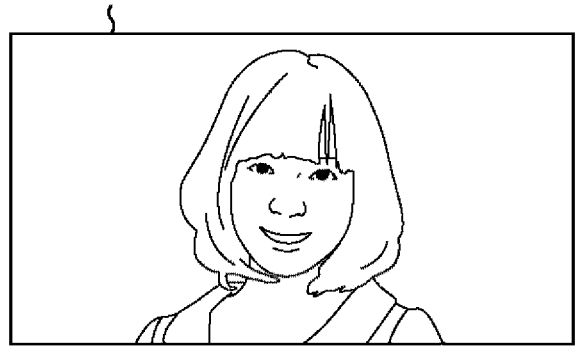
FIGS. 8A, 8B, and 8C are diagrams for describing an example of matching of a partial image.
Figure 8B:
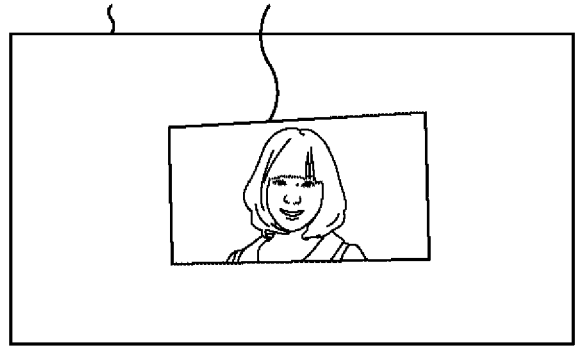
Figure 8C:

For example, in a captured image obtained by capturing a state in which an image 71 as illustrated in FIG. 8A is projected on a screen, an edge portion (near an image frame) of the image 71 is susceptible to an edge of the image frame and noise outside the image frame (for example, the shape, material, and the like of the screen), and is likely to be unsuitable for evaluation of the similarity. Therefore, as illustrated in FIG. 8B, in the case of generating a simulation image 72 at a certain posture, an area (an area 74 illustrated in FIG. 8C) excluding an end portion (near the image frame) of a projected image 73 is set, and matching may be performed only for the area 74.

The size of this area 74 (in other words, the width from an end portion of the projected image 73 to an end portion of the area 74) is arbitrary. Note that if the area 74 is too small, the accuracy of the posture estimation is decreased. Therefore, the area 74 is made as large as possible (that is, the width from an end portion of the projected image 73 to an end portion of the area 74 is made as narrow as possible) within a range in which the influence of the end portion of the projected image 73 and the influence outside the projected image 73 are sufficiently decreased, whereby the decrease in the accuracy of the posture estimation can be suppressed while suppressing the influence of the noise.

Note that this partial area may be set to any portion in the captured image (projected image) in any shape. Further, the number of the partial areas to be set is arbitrary. That is, the setting of the partial area can be used for any purpose other than suppression of the influence of the end portion of or the outside the projected image. For example, matching may be performed by enlarging (setting a high resolution to) the set partial area, and the posture estimation may be performed with higher accuracy. For example, in the case of performing the posture estimation for positioning projected images projected from a plurality of projection units, the object to be processed is limited to an overlap area where a plurality of the projected images is superimposed, and the matching may be performed, setting a high resolution to the overlap area. Further, for example, the captured image (simulation image) is divided into a plurality of partial areas, and matching of the partial areas may be processed in parallel. By doing this, the similarity can be evaluated faster. Furthermore, by setting a high resolution to each partial image, the posture estimation with higher accuracy can be realized.

<Repetition of Similarity Evaluation>

Note that the evaluation of the similarity between the captured image and the simulation image may be repeated a plurality of times. For example, matching may be repeated a plurality of times for one virtual posture, and evaluation results of the plurality of times may be comprehensively evaluated. For example, an average value, a median value, a total value, or the like of the similarity (or the evaluation results thereof) of the plurality of times may be evaluated. For example, matching may be repeated a plurality of times while varying a parameter to be compared (a luminance value, a color component, or the like), and evaluation results thereof may be comprehensively determined.

Further, for example, in such repetition of matching, next matching may be performed using a previous evaluation result (posture estimation result).

<Hierarchy of Accuracy>

Figure 9:
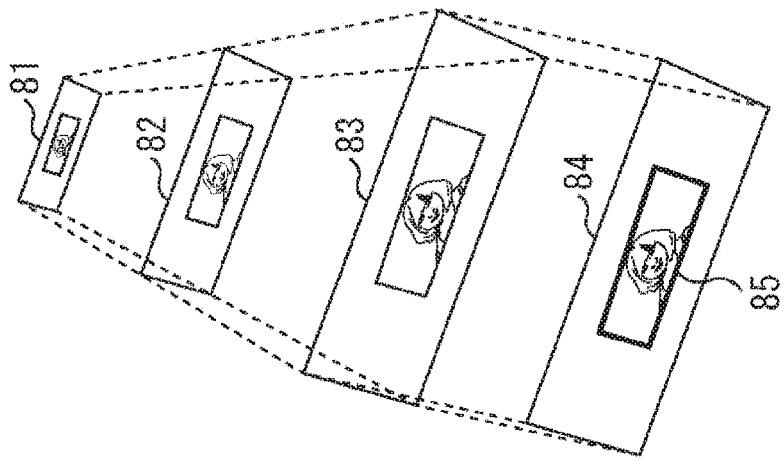
FIG. 9 is a diagram for describing an example of multi-stage matching.

Further, for example, as illustrated in FIG. 9, matching may be repeated a plurality of times while varying the resolution of the image, and evaluation results thereof may be comprehensively determined. The left side in FIG. 9 is a coded state of the repetition of the evaluation. In this case, in the first round, a reduced image as in an image 81 illustrated on the right side in FIG. 9 is used, and matching is performed targeting the entire image. In the second round, a reduced image larger than the first reduced image is used as in an image 82, and matching is performed targeting the entire image. In the third round, matching is performed targeting the entire image with an original size as in an image 83. In the fourth round, matching is performed targeting a partial area 85 of an image 84 with the original size.

By changing the resolution of the image in this way, the accuracy of the posture estimation of each time can be changed. That is, matching can be repeated to make the accuracy of the posture estimation multistage (hierarchized). In general, the load and processing time are increased in the posture estimation with higher accuracy than in the posture estimation with lower accuracy. That is, if matching with high accuracy is repeated, the load and processing time are further increased. Therefore, the accuracy of the posture estimation can be increased from low accuracy to high accuracy by repeating matching while increasing the resolution in this manner. That is, the posture estimation with high accuracy can be performed at a higher speed (that is, with higher efficiency) by, for example, performing the posture estimation with low accuracy at a high speed, and then performing the posture estimation with higher accuracy than the previous time, using the previous estimation result.

<Multiple Projection Unit and Multiple Imaging Unit>

Note that the numbers of projection units and imaging units that perform the posture estimation are arbitrary, and may be singular or plural. In the case of a plurality of projection units and imaging units, matching between the captured image and the simulation image may be performed for all combinations of the projection units and the imaging units. For example, in the case where a plurality of projection units and imaging units is provided (for example, in the case where a plurality of projection imaging devices is provided), the projected images projected from the projection units are imaged by the imaging units, the simulation images are generated for the captured images, and matching between each of the captured images with the simulation image may be performed. In the case where a discrepancy occurs in the results of the matching (posture estimation results), the determination may be comprehensively made by averaging the results or calculating the center of gravity, for example. Further, at that time, a part of the matching between the captured image and the simulation image may be omitted by excluding a posture estimation result with insufficient accuracy, for example. By suppressing unnecessary processing in this manner, an unnecessary increase in the load can be suppressed.

2. First Embodiment

<Projection Imaging System>

Figure 10:
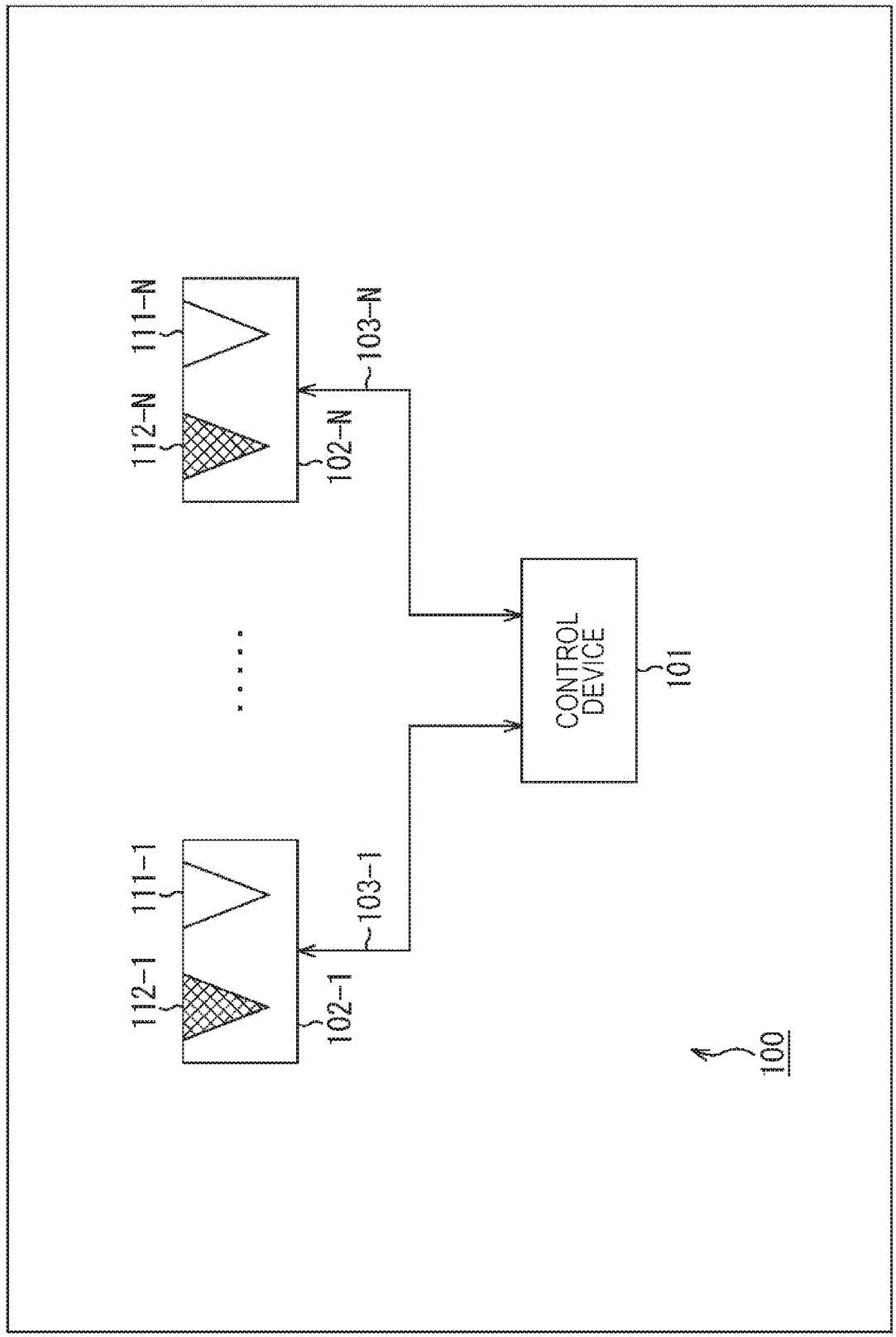
FIG. 10 is a block diagram illustrating a main configuration example of a projection imaging system.

FIG. 10 is a block diagram illustrating a main configuration example of an embodiment of a projection imaging system to which the present technology is applied. In FIG. 10, a projection imaging system 100 is a system capable of projecting an image, imaging a projected image, and performing posture estimation by a method to which the present technology is applied, that is, by the above-described method.

As illustrated in FIG. 10, the projection imaging system 100 includes a control device 101 and projection imaging devices 102-1 to 102-N (N is an arbitrary natural number). The projection imaging devices 102-1 to 102-N are connected to the control device 101 via cables 103-1 to 103-N, respectively.

Hereinafter, in the case where there is no need to distinguish and describe the projection imaging devices 102-1 to 102-N from one another, they are referred to as projection imaging device 102. Further, in the case where there is no need to distinguish and describe the cables 103-1 to 103-N from one another, they are referred to as cable 103.

The control device 101 controls each projection imaging device 102 via the cable 103. For example, the control device 101 supplies an image to be projected to each projection imaging device 102, and causes the projection imaging device 102 to project the image. Further, for example, the control device 101 instructs each projection imaging device 102 to image the projected image and the like, and acquires a captured image. Further, for example, the control device 101 generates a simulation image of the captured image and performs matching (similarity evaluation) between the captured image and the simulation image. Further, for example, the control device 101 estimates a posture of each projection imaging device 102 on the basis of an evaluation result of the similarity, reconstructs a screen (projection surface), and performs geometric correction for the image to be projected by each projection imaging device 102.

For example, the control device 101 may perform image processing such as enlargement, reduction, and deformation, for example, for the image to be projected, as the geometric correction. Further, for example, the control device 101 may control a projection direction, an imaging direction, and the like of an optical system of each projection imaging device 102, as the geometric correction, for example. Of course, both of the image processing and the control may be performed.

The projection imaging devices 102-1 to 102-N respectively include projection units 111-1 to 111-N for projecting an image, and imaging units 112-1 to 112-N for imaging an object. Hereinafter, in the case where there is no need to distinguish and describe the projection units 111-1 to 111-N from one another, they are referred to as projection unit 111. Further, in the case where there is no need to distinguish and describe the imaging units 112-1 to 112-N from one another, they are referred to as imaging unit 112.

The projection unit 111 has a function of a so-called projector. That is, the projection imaging device 102 can be driven as a projector, using the projection unit 111. For example, the projection imaging device 102 can project an image supplied from the control device 101 onto an arbitrary projection surface, using the projection unit 111.

The imaging unit 112 has a so-called camera function. That is, the projection imaging device 102 can be driven as a camera, using the imaging unit 112. For example, the projection imaging device 102 can image the projection surface on which the image is projected by the projection unit 111 and obtain a captured image, using the imaging unit 112. The projection imaging device 102 can further supply data of the captured image to the control device 101.

The number of the projection imaging devices 102 is arbitrary and may be singular or plural. In the case of a plurality of the projection imaging devices 102, the projection imaging devices 102 can operate independently of one another or can operate in cooperation with one another under the control of the control device 101. The projection imaging system 100 in the case of the plurality of projection imaging devices 102 in cooperation with one another functions as a so-called multi-projection system and can realize so-called projection mapping.

Note that parameters related to projection, such as a projection direction and a magnification ratio of an image, and distortion correction of a projected image, of the projection unit 111, may be able to be controlled, for example. Further, for example, the posture of an optical system included in the projection unit 111, the posture of the entire projection unit 111, and the like may be able to be controlled in order to control the parameters related to projection.

Further, parameters related to imaging, such as an imaging direction and an angle of view of an image, distortion correction of a captured image, and the like, of the imaging unit 112, may be able to be controlled, for example. Further, for example, the posture of an optical system included in the imaging unit 112, the posture of the entire imaging unit 112, and the like may be able to be controlled in order to control the parameters related to imaging.

Further, such control of the projection unit 111 and control of the imaging unit 112 may be performed independently of each other. Further, the posture of the projection imaging device 102 may be able to be controlled. Note that the control of the projection unit 111, the control of the imaging unit 112, and the control of the projection imaging device 102 as described above may be performed by the control device 101 or may be performed by a device other than the control device 101, such as the projection imaging device 102, for example.

The cable 103 is an electric communication cable of an arbitrary communication standard that communicably connects the control device 101 and the projection imaging device 102. That is, the cable 103 can serve as a communication medium between the control device 101 and the projection imaging device 102. Note that, in the projection imaging system 100, the control device 101 and the projection imaging device 102 just have to be communicably connected with each other. For example, the control device 101 and the projection imaging device 102 may be connected by wireless communication. In that case, the cable 103 can be omitted.

The control device 101 performs posture estimation of each projection unit 111 and each imaging unit 112 during projection of contents (for example, a moving image) (performs online sensing). The control device 101 causes a part or all of the imaging units 112 to image projected images projected by a part or all of the projection units 111, and performs matching between the obtained captured image and the simulation image of the captured image, thereby to perform the posture estimation of each projection unit 111 and each imaging unit 112.

<Control Device>

Figure 11:
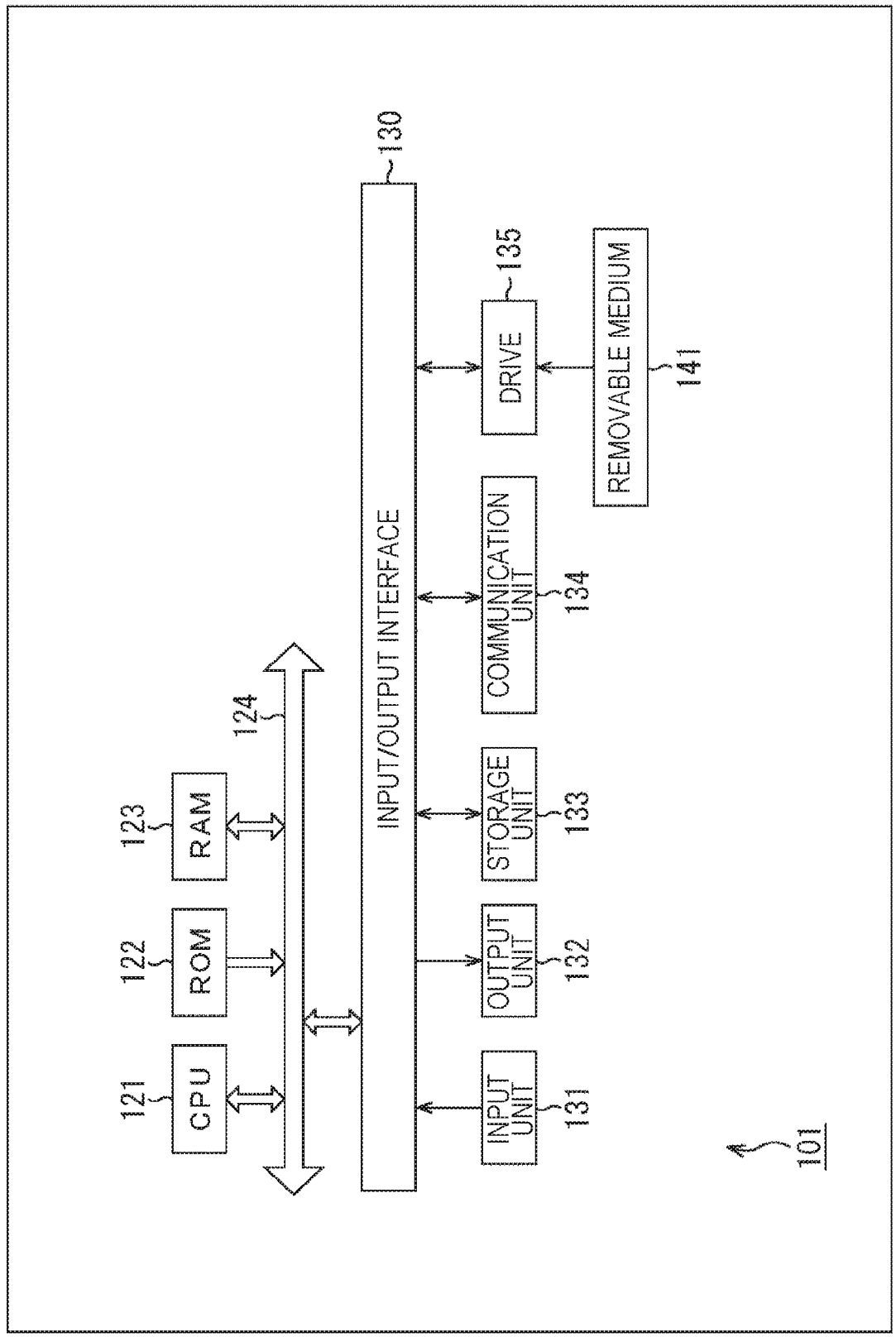
FIG. 11 is a block diagram illustrating a main configuration example of a control device.

FIG. 11 is a block diagram illustrating a main configuration example of the control device 101 as an embodiment of the image processing apparatus to which the present technology is applied.

As illustrated in FIG. 11, the control device 101 includes a CPU 121, a ROM 122, a RAM 123, a bus 124, an input/output interface 130, an input unit 131, an output unit 132, a storage unit 133, a communication unit 134, and a drive 135.

The CPU 121, the ROM 122, and the RAM 123 are mutually connected via the bus 124. The input/output interface 130 is also connected to the bus 124. The input unit 131, the output unit 132, the storage unit 133, the communication unit 134, and the drive 135 are connected to the input/output interface 130.

For example, the CPU 121 loads programs and the like stored in the ROM 122 and the storage unit 133 into the RAM 123 and executes the programs, thereby to perform various types of processing. In the RAM 123, data and the like necessary for the CPU 121 to execute the various types of processing are appropriately stored.

For example, the CPU 121 can perform processing of detection of the corresponding points by executing the programs and the like in such a way.

The input unit 131 includes an input device that accepts arbitrary external information such as user input, for example. This input device may be of any type. For example, the input device may be a keyboard, a mouse, an operation button, a touch panel, a camera, a microphone, a barcode reader, or the like. Further, the input device may be various sensors such as an acceleration sensor, a light sensor, and a temperature sensor. Further, the input device may be an input terminal that accepts the arbitrary external information as data (signal). The output unit 132 includes an output device that outputs arbitrary information inside the device such as an image and a sound, for example. This output device may be of any type. For example, the output device may be a display, a speaker, or the like. Further, the output device may be an output terminal that outputs arbitrary information to the outside as data (signal).

The storage unit 133 includes a storage medium that stores information such as programs and data. This storage medium may be of any type. For example, the storage unit 133 may be a hard disk, a RAM disk, a nonvolatile memory, or the like. The communication unit 134 includes a communication device that performs communication to give and receive information such as programs and data to and from an external device via a predetermined communication medium (for example, an arbitrary network such as the Internet). This communication device may be of any type. For example, the communication device may be a network interface. The communication method and communication standard of the communication by the communication unit 134 are arbitrary. For example, the communication unit 134 may be able to perform wired communication, wireless communication, or both of the wired and wireless communication.

The drive 135 performs processing of reading and writing information (programs, data, and the like) from and to a removable medium 141 attached to the drive 135. The removable medium 141 may be any recording medium. For example, the removable medium 141 may be a magnetic disk, an optical disk, a magneto-optical disk, a semiconductor memory, or the like. For example, the drive 135 reads information (programs, data, and the like) stored in the removable medium 141 attached to the drive 135 and supplies the information to the CPU 121, the RAM 123, and the like. Further, for example, the drive 135 acquires information (programs, data, and the like) supplied from the CPU 121, the RAM 123, and the like, and writes the information to the removable medium 141 attached to the drive 135.

<Functional Block of Control Device>

Figure 12:
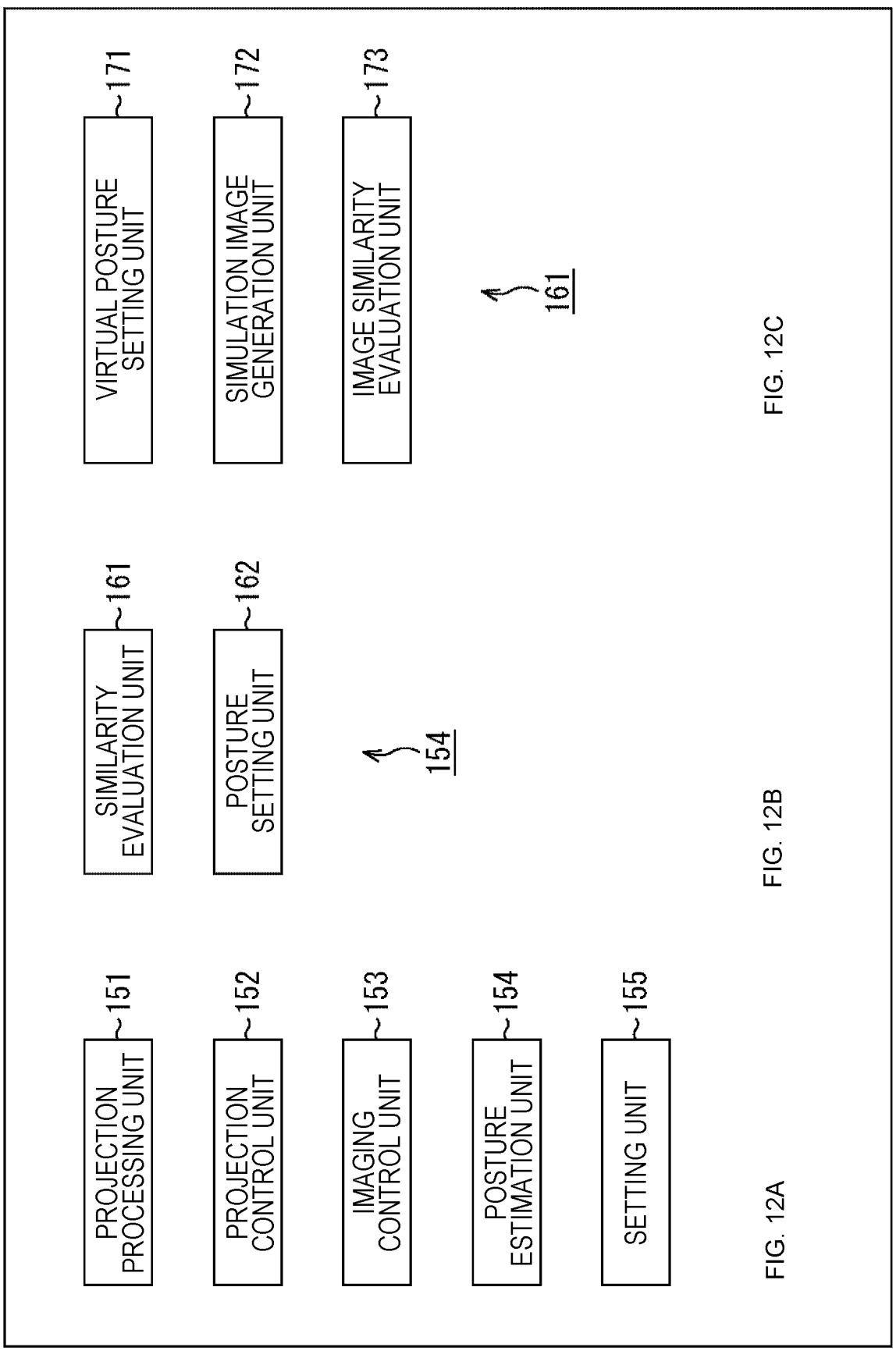
FIGS. 12A, 12B, and 12C are functional block diagrams illustrating a functional example realized by the control device.

FIG. 12A is a functional block diagram illustrating an example of functions realized by executing a program and the like by the control device 101. As illustrated in FIG. 12A, the control device 101 has functions of a projection processing unit 151, a projection control unit 152, an imaging control unit 153, a posture estimation unit 154, and a setting unit 155, for example, by executing the program.

The projection processing unit 151 performs processing of projection of contents (moving image). The projection control unit 152 performs processing of control of the projection units 111. The imaging control unit 153 performs processing of control of the imaging units 112. The posture estimation unit 154 performs processing of posture estimation and the like of the projection imaging devices 102 (or the projection units 111 and the imaging unit 112 of the projection imaging devices 102). The setting unit 155 performs processing of setting parameters regarding the geometric correction and the like.

Note that the blocks can give and receive information (for example, commands, data, and the like) to and from each other as needed. Further, the control device 101 may have functions other than the aforementioned functions.

<Posture Estimation Unit>

The posture estimation unit 154 in FIG. 12A has functions illustrated as function blocks in FIG. 12B. That is, the posture estimation unit 154 has functions of a similarity evaluation unit 161 and a posture setting unit 162, for example.

The similarity evaluation unit 161 performs processing of the evaluation of the similarity between the captured image and the simulation image. The posture setting unit 162 performs processing of setting postures of the projection unit 111 and the imaging unit 112.

Note that the blocks can give and receive information (for example, commands, data, and the like) to and from each other as needed. Further, the posture estimation unit 154 may have functions other than the aforementioned functions.

<Similarity Evaluation Unit>

The similarity evaluation unit 161 in FIG. 12B has functions illustrated as function blocks in FIG. 12C. That is, the similarity evaluation unit 161 has functions of a virtual posture setting unit 171, a simulation image generation unit 172, and an image similarity evaluation unit 173, for example.

The virtual posture setting unit 171 performs processing of setting the virtual posture. The simulation image generation unit 172 performs processing of generation of the simulation image. The image similarity evaluation unit 173 performs processing of evaluation of the similarity.

Note that the blocks can give and receive information (for example, commands, data, and the like) to and from each other as needed. Further, the similarity evaluation unit 161 may have functions other than the aforementioned functions.

<Projection Imaging Device>

Figure 13:
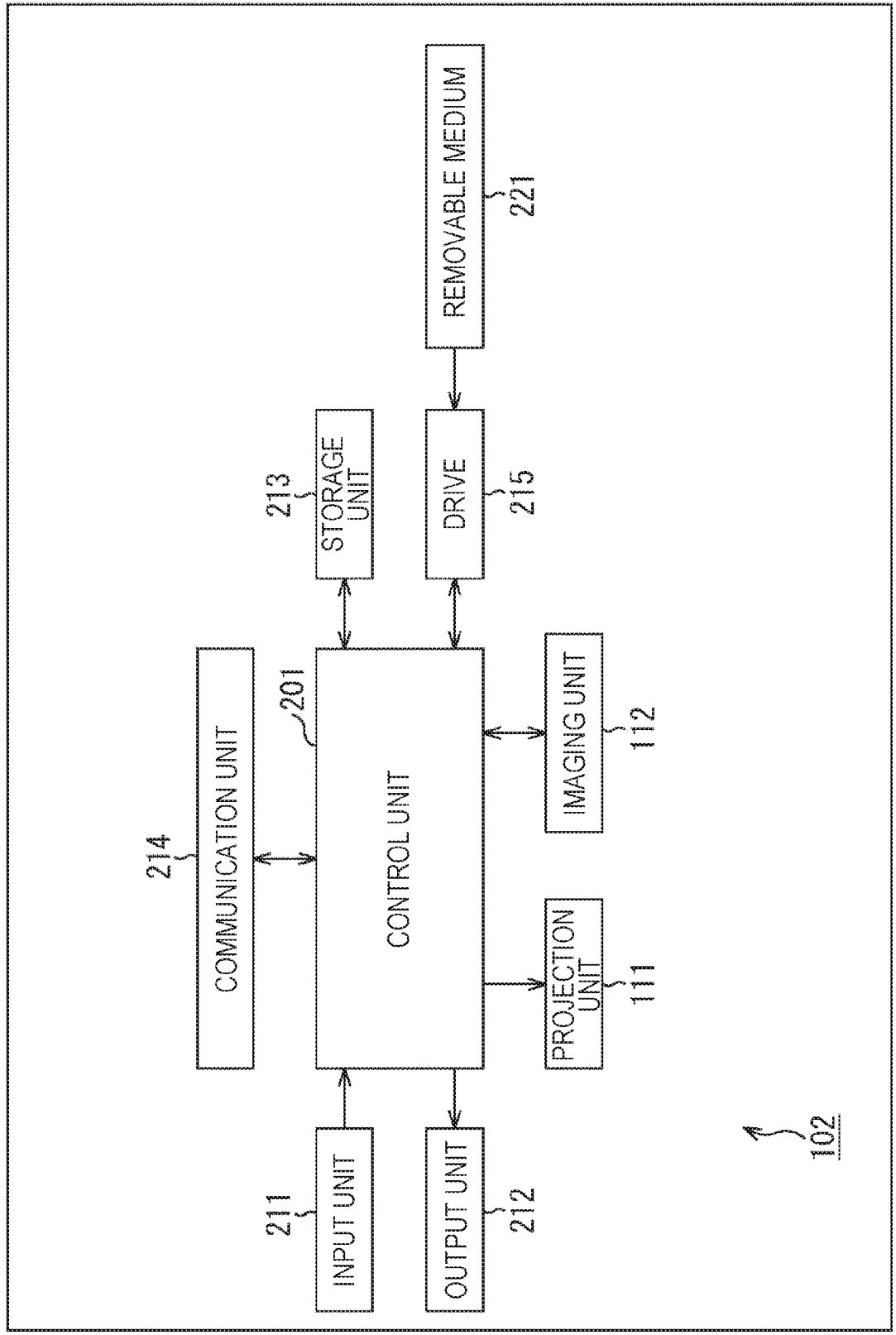
FIG. 13 is a block diagram illustrating a main configuration example of a projection imaging device.

FIG. 13 is a block diagram illustrating a main configuration example of the projection imaging device 102. As illustrated in FIG. 13, the projection imaging device 102 includes a control unit 201, the projection unit 111, the imaging unit 112, an input unit 211, an output unit 212, a storage unit 213, a communication unit 214, and a drive 215.

The control unit 201 includes, for example, a CPU, a ROM, a RAM, and the like, and controls each processing unit in the device and executes various types of processing necessary for control of image processing and the like, for example. The control unit 201 performs the processing on the basis of the control of the control device 101, for example. For example, the control unit 201 acquires an image supplied from the control device 101 via the communication unit 214, supplies the image to the projection unit 111, and causes the projection unit 111 to project the image according to the control of the control device 101. Further, for example, the control unit 201 causes the imaging unit 112 to capture a projection surface, acquires a captured image, and supplies the captured image to the control device 101 via the communication unit 214 according to the control of the control device 101.

The projection unit 111 performs processing of projection of an image by being controlled by the control unit 201. For example, the projection unit 111 projects an image supplied from the control unit 201 to the outside (for example, the projection surface or the like) of the projection imaging device 102. The projection unit 111 projects an image by using laser light as a light source and scanning the laser light, using a micro electro mechanical systems (MEMS) mirror. Of course, the light source of the projection unit 111 is arbitrary and is not limited to the laser light. For example, the light source may be a light emitting diode (LED), xenon, or the like. Note that the projection unit 111 may be any device as long as the device can project an image.

The imaging unit 112 is controlled by the control unit 201, captures an image of an object outside the device (for example, the projection surface or the like), generates a captured image, and supplies the captured image to the control unit 201. The imaging unit 112 includes, for example, an image sensor using a complementary metal oxide semiconductor (CMOS), an image sensor using a charge coupled device (CCD), or the like, photoelectrically converts light from the object by the image sensor, and generates an electric signal (data) of the captured image. For example, the imaging unit 112 is driven in synchronization with the projection unit 111, and captures a projected image projected onto the projection surface by the projection unit 111. Note that the imaging unit 112 may be any device as long as the device can capture a projected image.

The input unit 211 includes, for example, an input device that accepts arbitrary external information such as user input. This input device may be of any type. For example, the input device may be an operation button, a touch panel, a camera, a microphone, an input terminal, various kinds of sensors such as an acceleration sensor, a light sensor, and a temperature sensor, or the like. The output unit 212 includes, for example, an output device that outputs arbitrary information inside the device such as an image and a sound. This output device may be of any type. For example, the output device may be a display, a speaker, an output terminal, or the like.

The storage unit 213 includes a storage medium that stores information such as programs and data. This storage medium may be of any type. For example, the storage unit 133 may be a hard disk, a RAM disk, a nonvolatile memory, or the like.

The communication unit 214 includes a communication device that performs communication to give and receive information such as programs and data to and from an external device via a predetermined communication medium (for example, an arbitrary network such as the Internet). This communication device may be of any type. For example, the communication device may be a network interface. For example, the communication unit 214 is connected to a communication cable 103, and can perform communication with the control device 101 connected via the communication cable 103. The communication method and communication standard of communication by the communication unit 214 are arbitrary. For example, the communication unit 214 may be able to perform wired communication, wireless communication, or both of the wired and wireless communication.

The drive 215 performs processing of reading and writing information (programs, data, and the like) from and to a removable medium 221 attached to the drive 215. The removable medium 221 may be any recording medium. For example, the removable medium 221 may be a magnetic disk, an optical disk, a magneto-optical disk, a semiconductor memory, or the like. For example, the drive 215 reads information (programs, data, and the like) stored in the removable medium 221 attached to the drive 215 and supplies the information to the control unit 201, and the like. Further, for example, the drive 215 acquires information (programs, data, and the like) supplied from the control unit 201, and the like, and writes the information to the removable medium 221 attached to the drive 215.

<Projection Unit>

Figure 14:
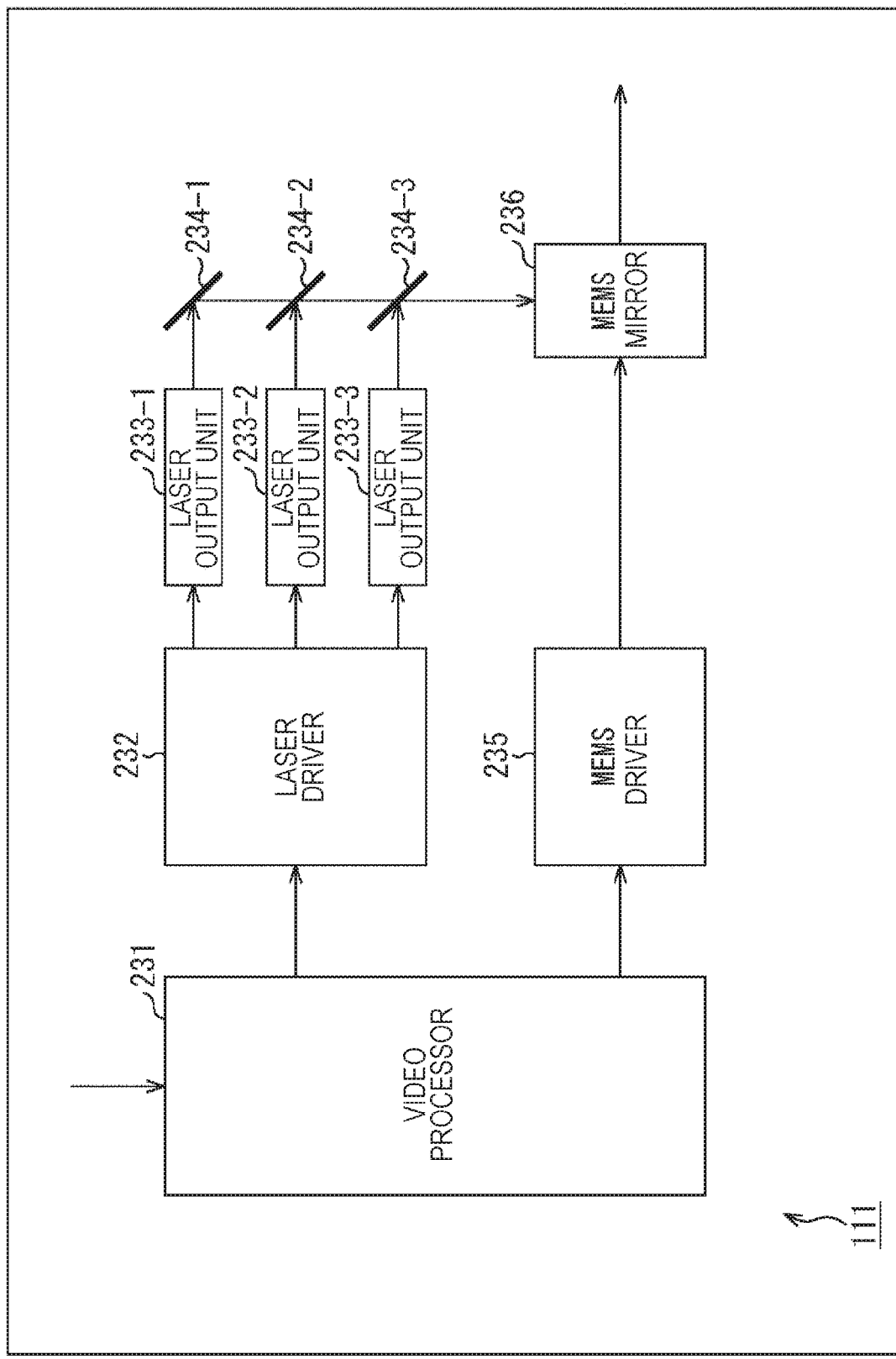
FIG. 14 is a block diagram illustrating a main configuration example of a projection unit.

FIG. 14 is a block diagram illustrating a main configuration example of the projection unit 111. As illustrated in FIG. 14, the projection unit 111 includes a video processor 231, a laser driver 232, a laser output unit 233-1, a laser output unit 233-2, a laser output unit 233-3, a mirror 234-1, a mirror 234-2, a mirror 234-3, a MEMS driver 235, and a MEMS mirror 236.

The video processor 231 holds an image supplied from the control unit 201 and performs necessary image processing for the image. The video processor 231 supplies the image to be projected to the laser driver 232 and the MEMS driver 235.

The laser driver 232 controls the laser output units 233-1 to 233-3 to project the image supplied from the video processor 231. The laser output units 233-1 to 233-3 output laser light in different colors (wavelength ranges) from one another, such as red, blue, and green, for example. That is, the laser driver 232 controls the laser output of each color to project the image supplied from the video processor 231. Note that, in the case where there is no need to distinguish and describe the laser output units 233-1 to 233-3 from one another, they are referred to as laser output unit 233.

The mirror 234-1 reflects the laser light output from the laser output unit 233-1 and guides the laser light to the MEMS mirror 236. The mirror 234-2 reflects the laser light output from the laser output unit 233-2, and guides the laser light to the MEMS mirror 236. The mirror 234-3 reflects the laser light output from the laser output unit 233-3, and guides the laser light to the MEMS mirror 236. Note that, in the case where there is no need to distinguish and describe the mirrors 234-1 to 234-3 from one another, they are referred to as mirror 234.

Figure 15:
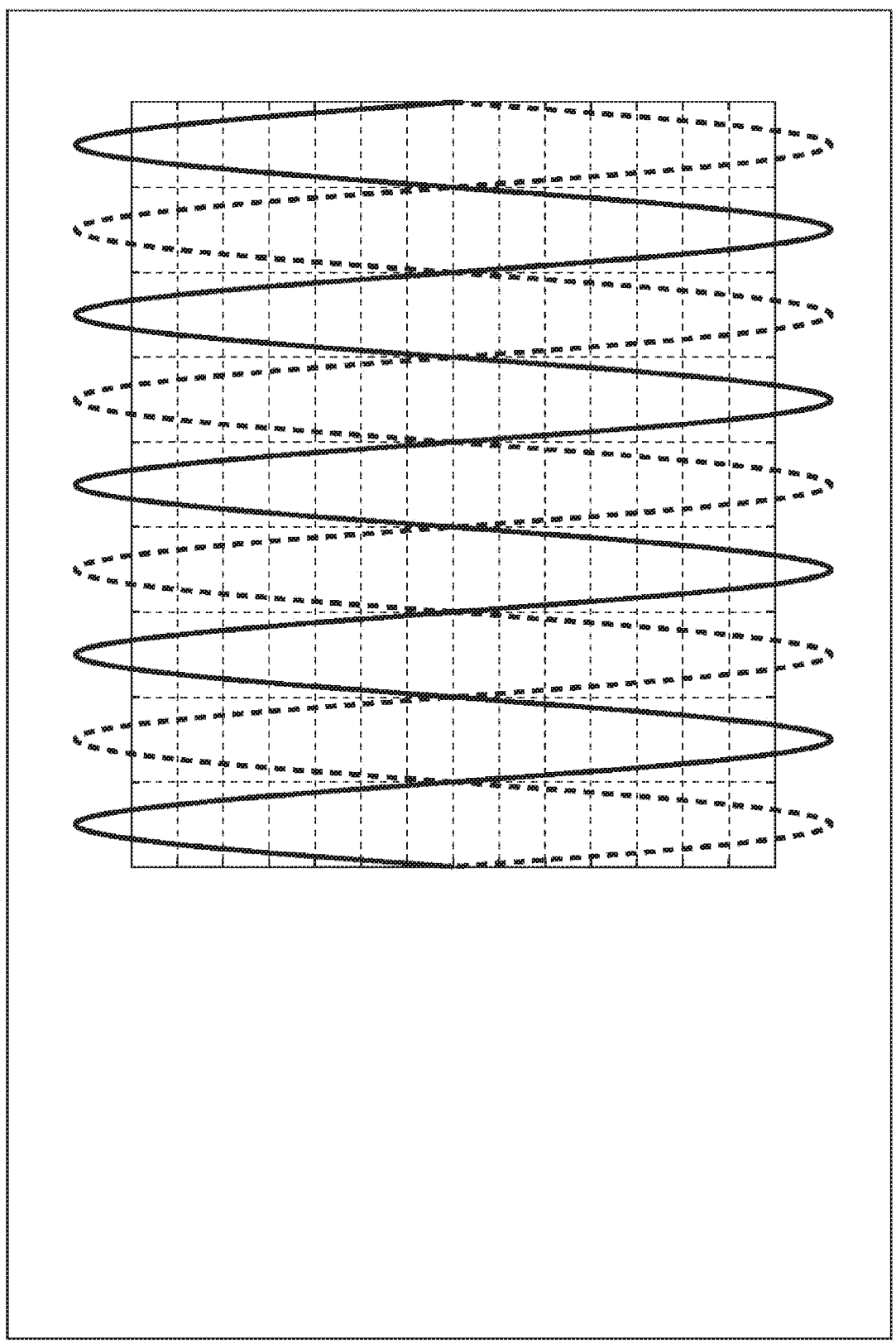
FIG. 15 is a diagram illustrating an example of scanning of laser light.

The MEMS driver 235 controls driving of the mirror of the MEMS mirror 236 to project the image supplied from the video processor 231. The MEMS mirror 236 drives the mirrors mounted on the MEMS according to the control of the MEMS driver 235 to scan the laser light in each color as in the example of FIG. 15, for example. The laser light is output to the outside of the device through a projection opening, and the projection surface is irradiated with the laser light, for example. With the irradiation, the image supplied from the video processor 231 is projected onto the projection surface.

Note that, in the example of FIG. 14, the description has been given in such a manner that three laser output units 233 are provided to output laser light in three colors. However, the number of the laser light (or the number of colors) is arbitrary. For example, the number of the laser output units 233 may be four or more, or two or less. That is, the number of laser light output from the projection imaging device 102 (projection unit 111) may be two or less, or four or more. Further, the number of colors of the laser light output from the projection imaging device 102 (projection unit 111) is also arbitrary, and may be two colors or less, or four or more colors. Further, configurations of the mirror 234 and the MEMS mirror 236 are also arbitrary, and are not limited to the example in FIG. 14. Of course, the scanning pattern of the laser light is arbitrary.

<Flow of Image Projection Processing>

Next, processing executed in the projection imaging system 100 having such configurations will be described. As described above, the control device 101 of the projection imaging system 100 controls the projection imaging device 102 and projects contents (moving image). An example of the flow of the image projection processing executed by the control device 101 to project such contents will be described with reference to the flowchart in FIG. 16.

When the image projection processing is started, in step S101, the posture estimation unit 154 of the control device 101 sets the postures of the projection unit 111 and the imaging unit 112. Further, the setting unit 155 sets parameters related to the geometric correction on the basis of the set postures.

In step S102, the projection processing unit 151 generates an image to be projected from the projection unit 111. For example, the projection processing unit 151 performs the geometric correction using the parameters set in step S101, and the like, for the input image (contents), and generates the image to be projected.

In step S103, the projection control unit 152 supplies the image generated in step S102 to the projection unit 111 and causes the projection unit 111 to project the image on the screen (projection surface).

In step S104, the imaging control unit 153 causes the imaging unit 112 to capture the projected image projected on the screen in step S103, and acquires a captured image.

In step S105, the posture estimation unit 154 determines whether or not to perform the posture estimation on the basis of the captured image obtained in step S104. That is, the posture estimation unit 154 detects change in the postures of the projection unit 111 and the imaging unit 112 on the basis of change in the position and shape of the projected image in the captured image, and determines whether or not to perform the posture estimation according to whether or not the change in the postures has been detected. In a case where the change in the postures has been detected, and the posture estimation has been determined to be performed, the processing proceeds to step S106.

In step S106, the posture estimation unit 154 executes posture estimation processing and performs the posture estimation using the captured image.

In step S107, the setting unit 155 sets the parameters related to the geometric correction on the basis of the posture estimated in step S106. That is, the setting unit 155 updates the setting of the parameters related to the geometric correction according to a posture estimation result.

When the processing of step S107 is completed, the processing proceeds to step S108. Further, in step S105, in a case where the change in the postures has not been detected, and the posture estimation has been determined not to be performed, the processing proceeds to step S108.

In step S108, the projection processing unit 151 determines whether or not to terminate the image projection, that is, the projection of the contents. In the case where the projection of the contents has not been terminated and stop of the projection has not been instructed from the user or the like, and the image projection has been determined to continue, the processing returns to step S102. That is, the processing of transfer to step S102 is executed for the next frame.

Further, in step S108, in the case where it is determined that the contents have been projected to the end or stop of the projection has been instructed from the user or the like, the image projection processing is terminated.

Note that, in the case where a plurality of the imaging units 112 exists, the control device 101 just has to execute the processing of steps S104 to S107 for each imaging unit 112. Further, in the case where a plurality of the projection units 111 exists, the control device 101 just has to execute the above image projection processing for each projection unit 111.

<Flow of Posture Estimation Processing>

Next, an example of a flow of the posture estimation processing executed in step S106 in FIG. 16 will be described with reference to the flowchart in FIG. 17.

When the posture estimation processing is started, the similarity evaluation unit 161 executes similarity evaluation processing in step S121, and compares the captured image and the simulation image and evaluates the similarity.

In step S122, the posture setting unit 162 sets the posture of the projection unit 111 and the imaging unit 112 or the postures of both the projection unit 111 and the imaging unit 112 on the basis of a similarity evaluation processing result of step S121. In other words, the posture setting unit 162 sets these postures to postures at which the evaluation of the similarity becomes optimum.

Figure 16:
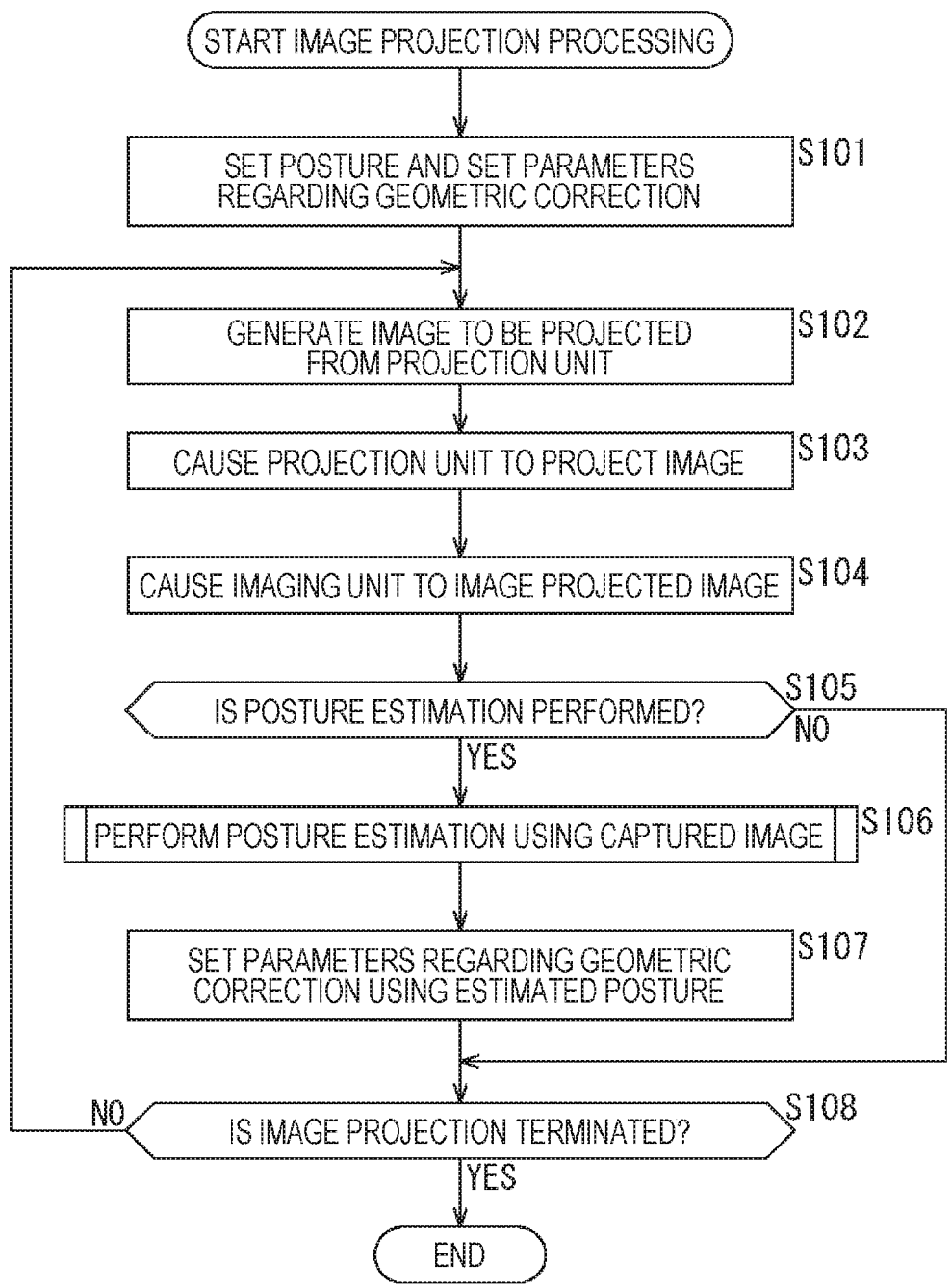
FIG. 16 is a flowchart for describing an example of a flow of image projection processing.

When the processing in step S122 is completed, the posture estimation processing is terminated, and the processing returns to FIG. 16.

<Flow of Similarity Evaluation Processing>

Next, an example of a flow of the similarity evaluation processing executed in step S121 in FIG. 17 will be described with reference to the flowchart in FIG. 18.

When the similarity evaluation processing is started, the virtual posture setting unit 171 sets the virtual postures of the projection unit 111 and the imaging unit 112 to initial values in step S141. These initial values are arbitrary. However, for example, a known posture, that is, a posture before posture change may be employed.

In step S142, the simulation image generation unit 172 generates a simulation image of the captured image at the virtual posture set in step S141.

In step S143, the image similarity evaluation unit 173 compares the captured image obtained in step S104 in FIG. 16 and the simulation image generated in step S142, and obtains and evaluates the similarity between the images. The image similarity evaluation unit 173 calculates and evaluates the similarity by the technique described in <1. Posture Estimation Using Image Similarity>.

In step S144, the image similarity evaluation unit 173 determines whether or not the similarity has been evaluated for all the virtual postures. In a case where it is determined that the similarity is to be evaluated for other virtual postures, the processing proceeds to step S145.

In step S145, the virtual posture setting unit 171 updates the setting of the virtual posture to a new posture. When the processing of step S145 is completed, the processing returns to step S142. That is, the processing of transfer to step S142 is executed for the updated virtual posture.

Figure 17:
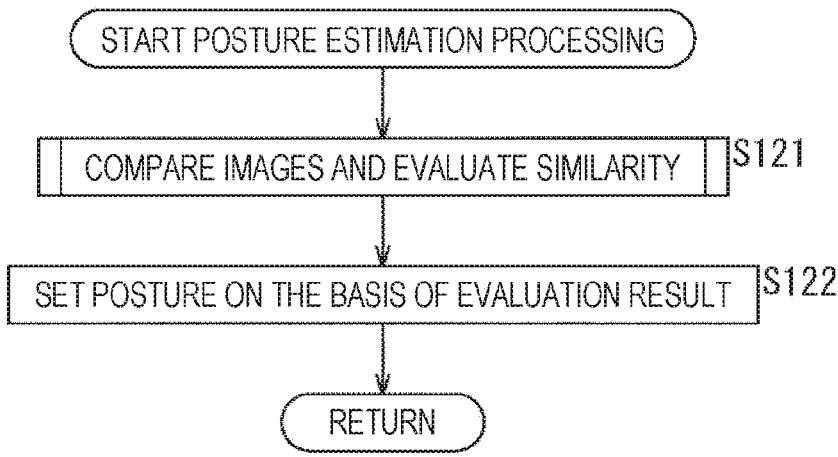
FIG. 17 is a flowchart for describing an example of a flow of posture estimation processing.
Figure 18:
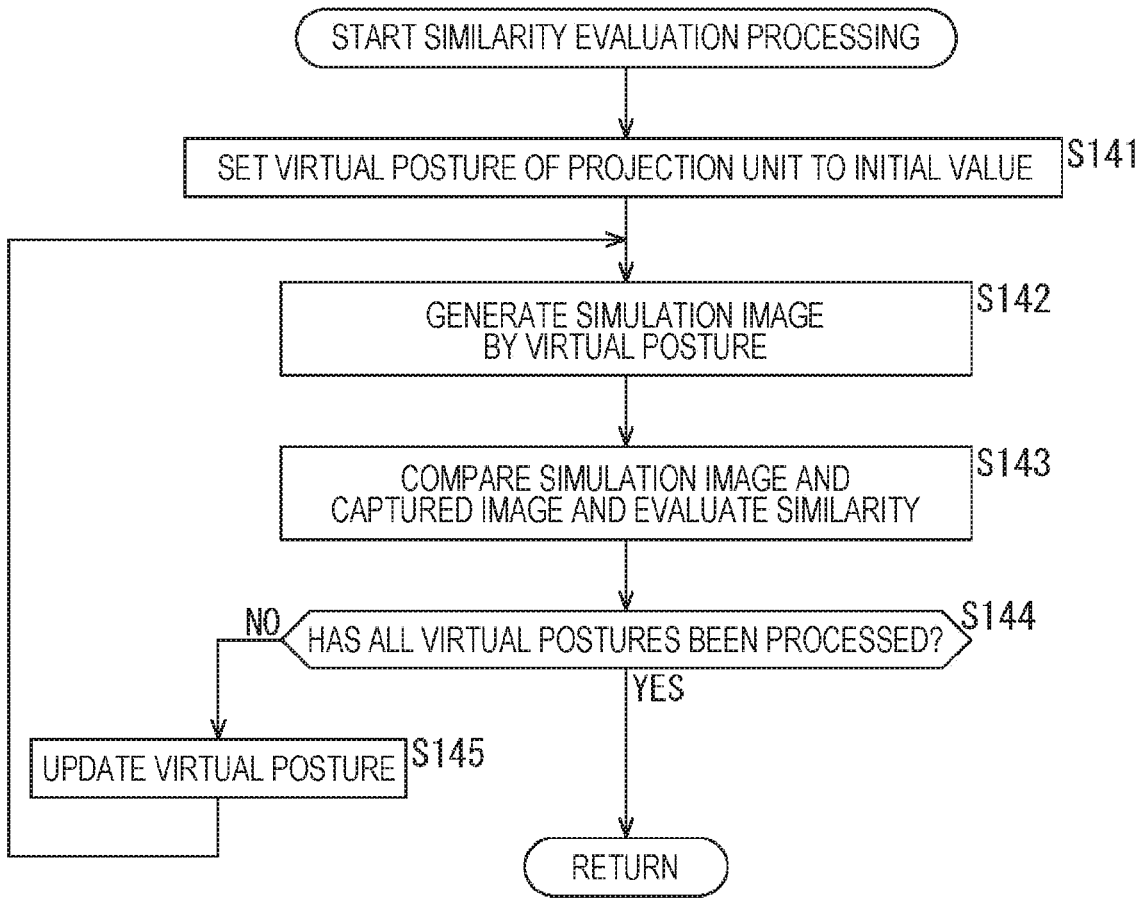
FIG. 18 is a flowchart for describing an example of a flow of similarity evaluation processing.

In step S144, the similarity is evaluated for all the virtual postures, and in a case where it is determined that the similarity is no longer evaluated for other virtual postures, the similarity evaluation processing is terminated, and the processing returns to FIG. 17.

By executing each processing as described above, the posture estimation can be performed on the basis of the evaluation result of the similarity between the captured image and the simulation image, and the robustness of the posture estimation during viewing of contents with respect to the projected image can be improved.

<How to Obtain Optimum Evaluation>

Note that the method of obtaining the posture at which the evaluation of the similarity becomes optimum (for example, the posture at which the value of the error function E becomes minimum) is arbitrary. For example, in the similarity evaluation processing in FIG. 18, the virtual postures are comprehensively set and the similarity is evaluated at all the virtual postures, and the posture at which the evaluation becomes optimum among all the virtual postures may be obtained. Further, for example, the virtual postures are comprehensively set within a predetermined range, the similarity is evaluated, and processing of obtaining the posture at which the optimum evaluation result is obtained may be repeated until a more favorable optimum evaluation result cannot be obtained. Further, for example, change between captured images before and after posture change (for example, change in the position and shape of the projected image included in the captured image) and the like are analyzed, and a rough tendency of the posture change (for example, how much the position or the direction is changed in which direction) is specified, and the virtual posture may be set according to the tendency. Further, for example, the posture estimation is repeated while changing the resolution, as described above, and the posture at which the optimum evaluation result can be obtained may be obtained with high accuracy. Furthermore, for example, the posture estimation may be performed for a plurality of frames. That is, for example, repetition of the posture estimation as described above may be performed over a plurality of frames (for example, the posture estimation of each time may be performed in a different frame).

3. Second Embodiment

<Combined Use of Corresponding Point Distance Evaluation>

Note that the posture estimation method based on similarity between images to which the above-described present technology is applied and the posture estimation method based on a distance between corresponding points, which has been described in <1. Posture Estimation Using Image Similarity> may be used together.

In general, posture estimation based on similarity can further improve the robustness to a projected image than posture estimation based on a distance between corresponding points. However, the posture estimation based on a distance between corresponding points has a smaller processing load than the posture estimation based on similarity. By combining both the techniques, more efficient posture estimation can be realized by making full use of characteristics of the techniques.

<Posture Estimation Unit>

Figure 19:
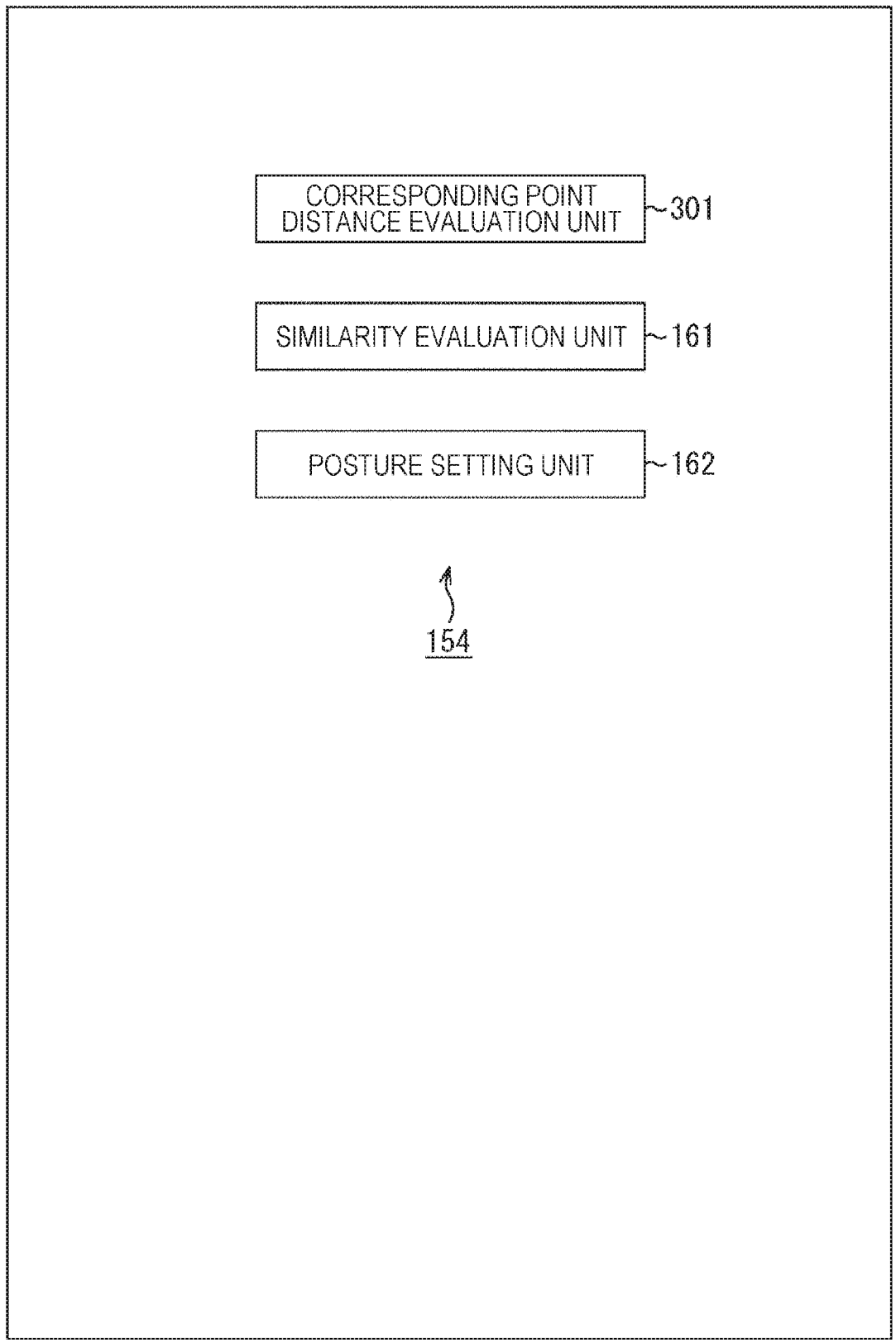
FIG. 19 is a functional block diagram illustrating a functional example realized by a posture estimation unit.

In this case, a posture estimation unit 154 has functions illustrated as function blocks in FIG. 19. That is, for example, the posture estimation unit 154 has a function of a corresponding point distance evaluation unit 301 in addition to functions of a similarity evaluation unit 161 and a posture setting unit 162.

The corresponding point distance evaluation unit 301 performs processing of evaluation of a distance between corresponding points. In this case, the posture setting unit 162 performs processing of posture setting on the basis of an evaluation result obtained in the corresponding point distance evaluation unit 301 and an evaluation result obtained in the similarity evaluation unit 161.

Note that the blocks can give and receive information (for example, commands, data, and the like) to and from each other as needed. Further, the posture estimation unit 154 may have functions other than the aforementioned functions.

<Posture Estimation Processing Flow 1>

Figure 20:
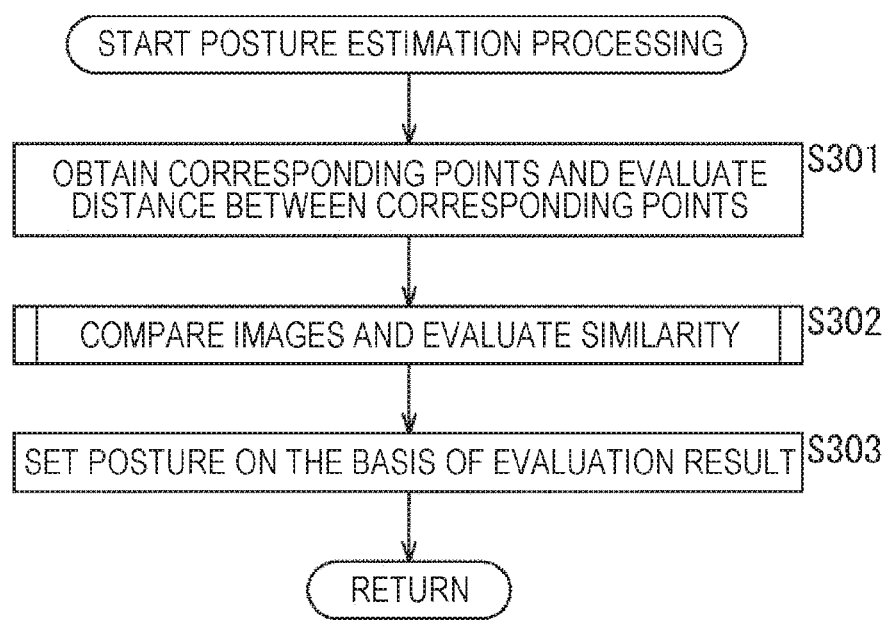
FIG. 20 is a flowchart for describing an example of a flow of the posture estimation processing.

For example, in the posture estimation, both the method based on similarity between images and the method based on a distance between corresponding points are necessarily performed, and a posture may be determined on the basis of estimation results of both the methods. An example of a flow of the posture estimation processing in that case will be described with reference to the flowchart in FIG. 20.

In this case, when posture estimation processing is started, in step S301, the corresponding point distance evaluation unit 301 obtains respective corresponding points by obtaining a correspondence relationship between characteristic points of a projected image included in a captured image and characteristic points of a projected image included in a simulation image. Then, the corresponding point distance evaluation unit 301 obtains a distance between the corresponding points and evaluates the distance, using an error function E or the like.

In step S302, the similarity evaluation unit 161 executes similarity evaluation processing, compares the captured image and the simulation image, and evaluates the similarity between the images. Note that this similarity evaluation processing is basically executed in a similar manner to the case described with reference to the flowchart in FIG. 18 in the first embodiment.

In step S303, the posture setting unit 162 sets a virtual posture at which optimum evaluation has been obtained as a posture of a projection unit 111 or an imaging unit 112 or postures of both the projection unit 111 and the imaging unit 112 on the basis of the evaluation results of steps S301 and S302. When the processing in step S303 is completed, the posture estimation processing is terminated, and the processing returns to FIG. 16.

By performing the posture estimation by the plurality of methods in this manner, the posture estimation can be more accurately performed under more various conditions. Therefore, the robustness of the posture estimation with respect to the projected image can be further improved.

Note that, in this case, either the posture estimation based on a distance between corresponding points or the posture estimation based on similarity between images may be performed first. Further, for example, the posture estimation is performed by the method based on a distance between corresponding points, which has a relatively light load, and then the posture estimation may be performed by the method based on similarity between images, which has relatively high accuracy, using the estimation result as an initial value. That is, in the case of the example of FIG. 20, the processing in step S302 may be performed reflecting the processing result in step S301 as the initial value of step S302. By doing this, the posture estimation by these two methods can be more efficiently performed.

<Posture Estimation Processing Flow 2>

Further, in the posture estimation, the method based on similarity between images and the method based on a distance between corresponding points may be selectively performed. Although information as the basis for this selection is arbitrary, for example, either one of the methods may be selected and executed according to a predetermined condition such as the content of a projected image or a tendency of detected corresponding points. For example, in the case where the number of detected corresponding points is large and positions of the corresponding points are less biased, the method based on a distance between corresponding points may be selected, otherwise, the method based on similarity between images may be selected.

Figure 21:
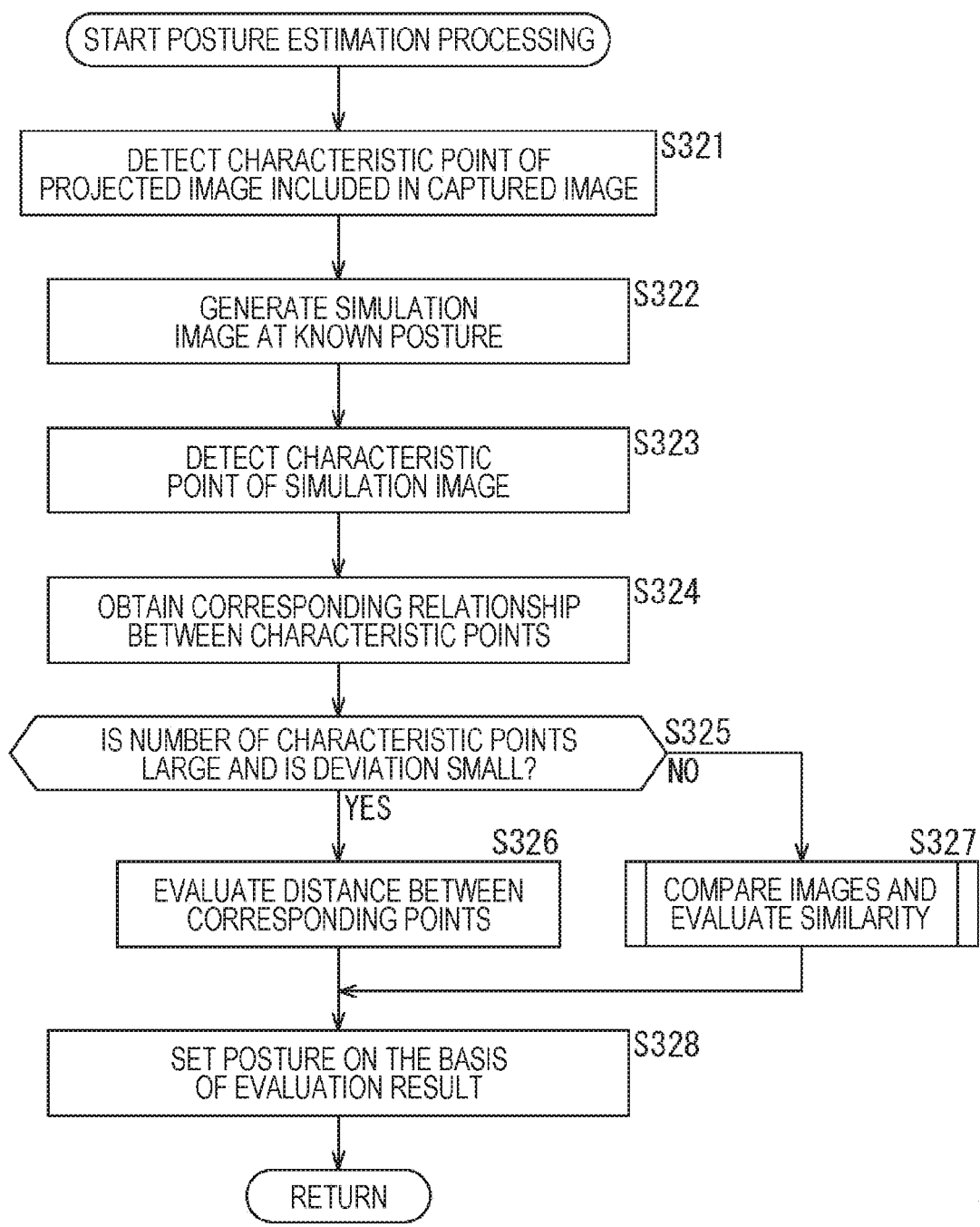
FIG. 21 is a flowchart for describing an example of a flow of the posture estimation processing.

An example of a flow of the posture estimation processing in that case will be described with reference to the flowchart in FIG. 21. In this case, when the posture estimation processing is started, the corresponding point distance evaluation unit 301 detects the characteristic points of the projected image included in the captured image in step S321.

In step S322, the corresponding point distance evaluation unit 301 generates the simulation image at a known posture.

In step S323, the corresponding point distance evaluation unit 301 detects the characteristic points of the simulation image.

In step S324, the corresponding point distance evaluation unit 301 obtains the correspondence relationship between the characteristic points of the captured image detected in step S321 and the characteristic points of the simulation image detected in step S323 (that is, the correspondence relationship between the characteristic points). That is, the corresponding point distance evaluation unit 301 detects the corresponding points.

In step S325, the corresponding point distance evaluation unit 301 determines whether or not the number of corresponding points detected in step S324 is sufficiently large and the bias of the positions of the corresponding points is sufficiently small. For example, the corresponding point distance evaluation unit 301 compares the number or distribution of the detected corresponding points with predetermined threshold values and make the determination. In a case where it is determined that the number of corresponding points is sufficiently large and the bias of the positions of the corresponding points is sufficiently small, the processing proceeds to step S326.

In step S326, the corresponding point distance evaluation unit 301 obtains the distance between the corresponding points and evaluates the distance, using the error function E or the like. When the processing of step S326 is completed, the processing proceeds to step S328.

Further, in step S325, in a case where it is determined that the number of corresponding points is small or the bias of the positions of the corresponding points is large, the processing proceeds to step S327. In step S327, the similarity evaluation unit 161 executes the similarity evaluation processing, compares the captured image and the simulation image, and evaluates the similarity between the images. Note that this similarity evaluation processing is basically executed in a similar manner to the case described with reference to the flowchart in FIG. 18 in the first embodiment. When the processing of step S327 is completed, the processing proceeds to step S328.

In step S328, the posture setting unit 162 sets the virtual posture at which optimum evaluation has been obtained as the posture of the projection unit 111 or the imaging unit 112 or the postures of both the projection unit 111 and the imaging unit 112 on the basis of the evaluation result of step S326 or S327. When the processing in step S328 is completed, the posture estimation processing is terminated, and the processing returns to FIG. 16.

By doing this, in a case where the posture estimation with sufficient accuracy can be performed by the method based on a distance between corresponding points, the method based on a distance between corresponding points, which has a relatively light load, can be selected, and in a case where sufficient accuracy cannot be obtained by the method based on a distance between corresponding points, the method based on similarity between images, which has relatively high accuracy, can be selected. Therefore, more accurate posture estimation can be performed for more various images. That is, the robustness of the posture estimation with respect to the projected image can be further improved.

Note that the posture estimation method used together with the method based on similarity between images, which is the posture estimation method to which the present technology is applied, is arbitrary, and a method other than the method based on a distance between corresponding points may be employed.

4. Third Embodiment

<Another Configuration Example of Projection Imaging System and Projection Imaging Device>

Figure 22A:
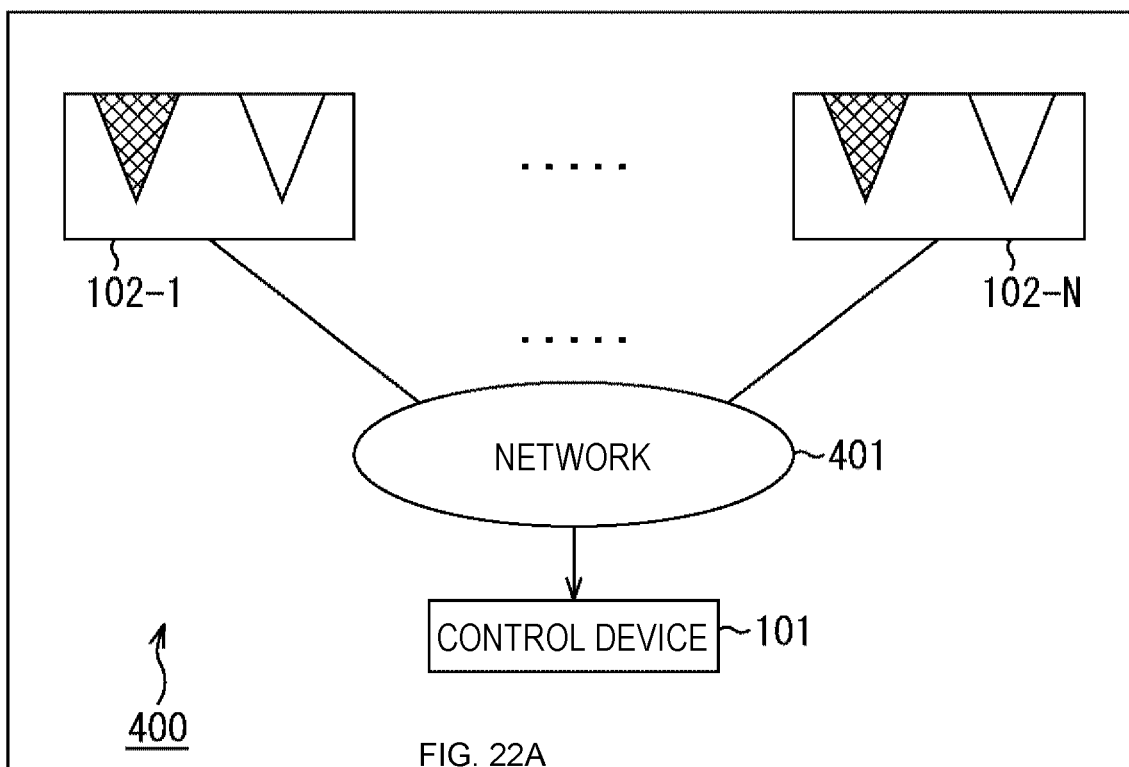
FIGS. 22A and 22B are block diagrams illustrating another configuration example of the projection imaging system.

Note that the configuration example of the projection imaging system to which the present technology is applied is not limited to the above-described example. For example, like a projection imaging system 400 illustrated in FIG. 22A, a control device 101 and each projection imaging device 102 may be connected with each other via a network 401.

The network 401 is an arbitrary communication network. The communication method employed in the network 401 is arbitrary. For example, the communication may be wired communication, wireless communication, or both of the wired and wireless communication. Further, the network 401 may be configured by a single communication network or by a plurality of communication networks. For example, the network 401 may include a communication network or a communication path of an arbitrary communication standard, such as the Internet, a public telephone network, a wide area communication network for wireless moving body such as so-called 3G network or 4G network, a wide area network (WAN), a local area network (LAN), a wireless communication network that performs communication conforming to Bluetooth (registered trademark) standard, a communication path for near field communication such as NFC, a communication path for infrared communication, or a communication network for wired communication conforming to a standard such as high-definition multimedia interface (HDMI (registered trademark)) or universal serial bus (USB).

The control device 101 and each projection imaging device 102 are communicably connected to the network 401. Note that this connection may be wired (that is, connection via wired communication), wireless (that is, connection via wireless communication), or both of the wired and wireless communication. Note that the number of devices, the shape and size of housings, an arrangement position, and the like are arbitrary.

The control device 101 and each projection imaging device 102 can perform communication with each other (to give and receive information) via the network 401. In other words, the control device 101 and each projection imaging device 102 may be communicably connected to each other via another facility (a device, a transmission path, or the like).

The present technology can be applied to the projection imaging system 400 having such a configuration, similarly to the projection imaging system 100, and the above-described functions and effects can be exhibited.

Figure 22B:
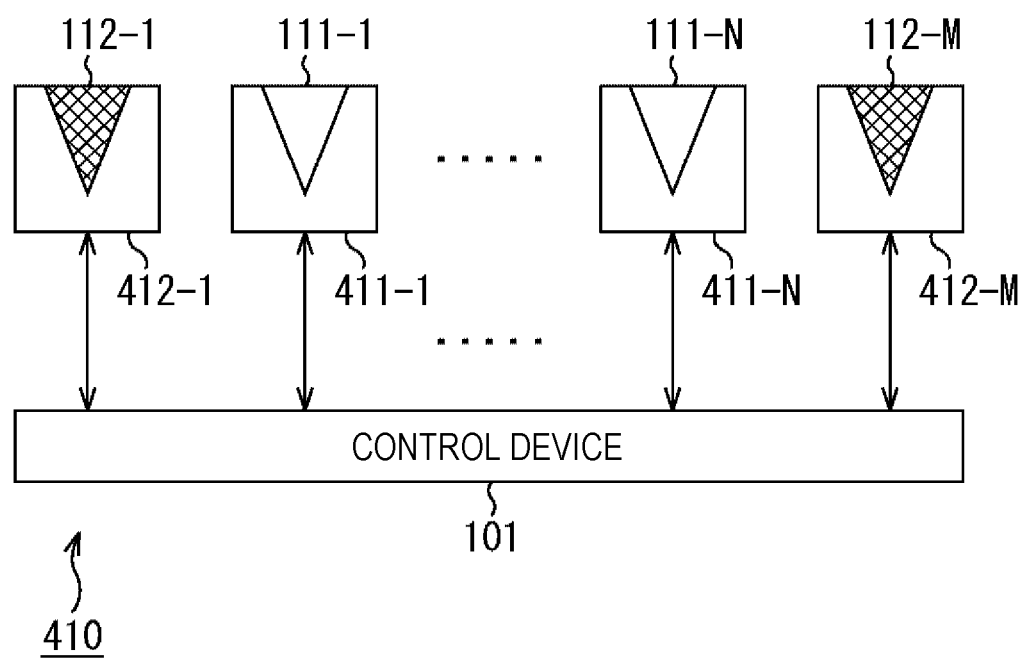

Further, for example, as in a projection imaging system 410 illustrated in FIG. 22B, the projection unit 111 and the imaging unit 112 may be configured as different devices from each other. The projection imaging system 410 includes projection devices 411-1 to 411-N (N is an arbitrary natural number) and imaging devices 412-1 to 412-M (M is an arbitrary natural number) in place of the projection imaging device 102. The projection devices 411-1 to 411-N respectively include projection units 111 (projection units 111-1 to 111-N) and project an image. The imaging devices 412-1 to 412-M respectively include imaging units 112 (imaging units 112-1 to 112-M), and image a projection surface (a projected image projected by the projection unit 111).

In the case where there is no need to distinguish and describe the projection devices 411-1 to 411-N from one another, they are referred to as projection device 411. In the case where there is no need to distinguish and describe the imaging devices 412-1 to 412-M from one another, they are referred to as imaging device 412.

Each projection device 411 and each imaging device 412 are communicably connected with the control device 101, and can perform communication with (give and receive information to and from) the control device 101 by wired communication, wireless communication, or both of the wired and wireless communication. Note that each projection device 411 and each imaging device 412 may be able to perform communication with another projection device 411 or another imaging device 412, or both of the other projection device 411 and the other imaging device 412 via the control device 101.

Note that the number of devices, the shape and size of housings, an arrangement position, and the like are arbitrary. Further, like the example in FIG. 22A, the devices may be communicably connected with one another via another facility (device or transmission path) such as the network 401.

The present technology can be applied to the projection imaging system 410 having such a configuration, similarly to the projection imaging system 100, and the above-described functions and effects can be exhibited.

Figure 23A:
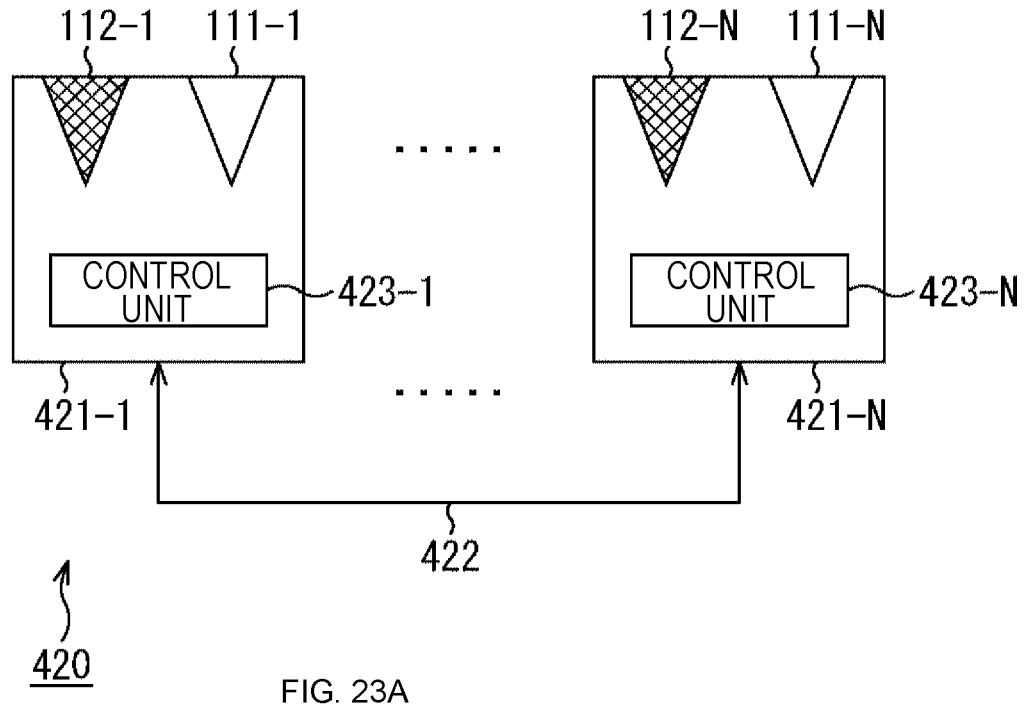
FIGS. 23A and 23B are block diagrams illustrating a main configuration example of the projection imaging system and the projection imaging device.

Further, the control device 101 may be omitted, as in a projection imaging system 420 illustrated in FIG. 23A, for example. As illustrated in FIG. 23A, the projection imaging system 420 includes projection imaging devices 421-1 to 421-N(N is an arbitrary natural number). In the case where there is no need to distinguish and describe the projection imaging devices 421-1 to 421-N from one another, they are referred to as projection imaging device 421. The projection imaging devices 421 are communicably connected with one another via a communication cable 422. Note that the projection imaging devices 421 may be communicably connected with one another by wireless communication.

The projection imaging devices 421-1 to 421-N respectively include control units 423-1 to 423-N. In the case where there is no need to distinguish and describe the control units 423-1 to 423-N from one another, they are referred to as control unit 423. The control unit 423 has a similar function to the control device 101 and performs similar processing.

That is, in the case of the projection imaging system 420, the processing performed in the above-described control device 101 is executed in (the control unit 423 of) the projection imaging device 421. Note that (the control unit 423 of) any one of the projection imaging devices 421 may execute all the processing performed in the control device 101, or a plurality of (the control units 423 of) the projection imaging devices 421 may execute the processing in cooperation with one another by giving and receiving information and the like.

The present technology can be applied to the projection imaging system 420 having such a configuration, similarly to the projection imaging system 100, and the above-described functions and effects can be exhibited.

Figure 23B:
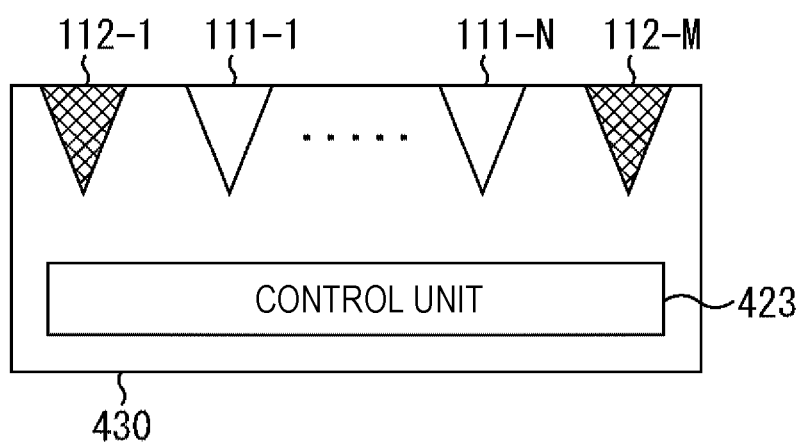

Further, for example, as illustrated in FIG. 23B, the projection imaging system 100 may be configured as one device. A projection imaging device 430 illustrated in FIG. 23B includes projection units 111 (projection units 111-1 to 111-N (N is an arbitrary natural number)), imaging units 112 (imaging units 112-1 to 112-M (M is an arbitrary natural number)), and a control unit 423.

In the projection imaging device 430, the control unit 423 controls the projection units 111 and the imaging units 112 to perform the posture estimation and the like by executing the processing performed in the above-described control device 101.

Therefore, the present technology can be applied to the projection imaging device 430 having such a configuration, similarly to the projection imaging system 100, and the above-described functions and effects can be exhibited.

5. Others

<Application Example of Present Technology>

The systems and devices according to the above-described embodiments can be applied to arbitrary systems and electronic devices. Further, the present technology can be applied to image processing systems and image processing apparatuses in arbitrary fields such as traffic, medical care, crime prevention, agriculture, livestock industry, mining, beauty, factory, household appliance, weather, and natural surveillance, for example.

For example, the present technology can also be applied to a system that projects and images an image provided for appreciation. Further, for example, the present technology can be applied to a system provided for traffic. Further, for example, the present technology can be applied to a system provided for security. Further, for example, the present technology can be applied to a system provided for sports. Further, for example, the present technology can be applied to a system provided for agriculture. Further, for example, the present technology can be applied to a system provided for livestock industry. Further, for example, the present technology can be applied to a system for monitoring natural conditions such as volcanoes, forests, or oceans, for example, a meteorological observation system for observing weather, temperature, humidity, wind speed, sunshine time, and the like, for example, or a system for observing the ecology of wildlife such as birds, fish, reptiles, amphibians, mammals, insects, or plants, for example.

<Software>

The series of processing described above can be executed by hardware or by software. In the case of causing the series of processing to be executed by software, a program that configures the software is installed from a network or a recording medium.

For example, in the case of the control device 101 in FIG. 11, this recording medium is configured by the removable medium 141 on which a program is recorded, which is distributed for distribution of the program to a user, separately from a main body of the device. In that case, for example, by attaching the removable medium 141 to the drive 135, the program stored in the removable medium 141 can be read out and installed in the storage unit 133.

Further, for example, in the case of the projection imaging device 102 in FIG. 13, this recording medium is configured by the removable medium 221 on which a program is recorded, which is distributed for distribution of the program to a user, separately from a main body of the device. In that case, for example, by attaching the removable medium 221 to the drive 215, the program stored in the removable medium 221 can be read out and installed in the storage unit 213.

Further, this program can be provided via a wired or wireless transmission medium such as a local area network, the Internet, or digital satellite broadcast. For example, in the case of the control device 101 in FIG. 11, the program can be received by the communication unit 134 and installed in the storage unit 133. Further, for example, in the case of the projection imaging device 102 in FIG. 13, the program can be received by the communication unit 214 and installed in the storage unit 213.

Other than the above, the program can be installed in a storage unit, a ROM, or the like, in advance. For example, in the case of the control device 101 in FIG. 11, the program can be installed in advance in the storage unit 133, the ROM 122, or the like. Further, for example, in the case of the projection imaging device 102 in FIG. 13, the program may be installed in advance in the storage unit 213, a ROM (not illustrated) built in the control unit 201, or the like.

Note that, in the program executed by the computer, the processing of the steps describing the program may be executed in chronological order according to the order described in the present specification, or may be individually executed in parallel or at necessary timing when a call is made. Further, the processing of the steps describing the program may be executed in parallel with the processing of another program, or may be executed in combination with the processing of another program.

Further, the processing of each of the steps can be executed by each of the above-described devices or by an arbitrary device other than the aforementioned devices. In that case, the device that executes the processing just has to have the above-described function (function block or the like) necessary for executing the processing. Further, information necessary for the processing just has to be transmitted to the device as appropriate.

<Others>

Embodiments of the present technology are not limited to the above-described embodiments, and various modifications can be made without departing from the gist of the present technology.

For example, in this specification, the term "system" means a group of a plurality of configuration elements (devices, modules (parts), and the like), and whether or not all the configuration elements are in the same casing is irrelevant. Therefore, a plurality of devices that is housed in separate casings and connected via a network, and one device that houses a plurality of modules in one casing are both systems.

Further, for example, the configuration described as one device (or processing unit) may be divided into and configured as a plurality of devices (or processing units). On the contrary, the configuration described above as a plurality of devices (or processing units) may be collectively configured as one device (or processing unit). Further, a configuration other than the above-described configuration may be added to the configuration of each device (or each processing unit). Further, a part of the configuration of a certain device (or processing unit) may be included in the configuration of another device (or another processing unit) as long as the configuration and operation of the entire system are substantially the same.

Further, for example, in the present technology, a configuration of cloud computing in which one function is shared and processed in cooperation by a plurality of devices via a network can be adopted.

Further, for example, the steps described in the above-described flowcharts can be executed by one device or can be executed by a plurality of devices in a shared manner. Furthermore, in the case where a plurality of processes is included in one step, the plurality of processes included in the one step can be executed by one device or can be shared and executed by a plurality of devices.

Further, the present technology can be implemented not only as a device or a system but also as any configuration to be mounted on a device that configures the device or the system, such as a processor as a system large scale integration (LSI) or the like, a module using a plurality of processors or the like, a unit using a plurality of modules or the like, or a set in which other functions are added to the unit (that is, a configuration of a part of the device), for example.

Note that the plurality of technologies described in the present specification can be implemented independently of one another as a single unit as long as there is no inconsistency. Of course, an arbitrary number of the present technologies can be implemented together. For example, the present technology described in any of the embodiments can be implemented in combination with the present technology described in another embodiment. Further, an arbitrary present technology described above can be implemented in combination with another technology not described above.

Note that the present technology can also have the following configurations.

(1) An image processing apparatus including:

a similarity evaluation unit configured to evaluate similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit; and a posture setting unit configured to set a posture of the projection unit or the imaging unit or postures of both of the projection unit and the imaging unit as an estimation result on the basis of an evaluation result of the similarity by the similarity evaluation unit.

(2) The image processing apparatus according to (1), in which the posture setting unit sets the posture of the projection unit or the imaging unit or the postures of both of the projection unit and the imaging unit as the estimation result, the postures having been evaluated to have the optimum similarity by the similarity evaluation unit.

(3) The image processing apparatus according to (1) or (2), in which the similarity evaluation unit obtains a sum of differences in absolute values of luminance values of pixels between the simulation image and the captured image, as an evaluation value indicating the similarity, and the posture setting unit sets the posture of the projection unit or the imaging unit or the postures of both of the projection unit and the imaging unit, the postures having the minimum evaluation value, as the estimation result.

(4) The image processing apparatus according to any one of (1) to (3), in which the similarity evaluation unit obtains a sum of squares of differences in luminance values of pixels between the simulation image and the captured image, as an evaluation value indicating the similarity, and the posture setting unit sets the posture of the projection unit or the imaging unit or the postures of both of the projection unit and the imaging unit, the postures having the minimum evaluation value, as the estimation result.

(5) The image processing apparatus according to any one of (1) to (4), in which the similarity evaluation unit obtains normalized cross-correlation between the simulation image and the captured image, as an evaluation value indicating the similarity, and the posture setting unit sets the posture of the projection unit or the imaging unit or the postures of both of the projection unit and the imaging unit, the postures having the maximum evaluation value, as the estimation result.

(6) The image processing apparatus according to any one of (1) to (5), in which the similarity evaluation unit obtains zero-mean normalized cross-correlation between the simulation image and the captured image, as an evaluation value indicating the similarity, and the posture setting unit sets the posture of the projection unit or the imaging unit or the postures of both of the projection unit and the imaging unit, the postures having the maximum evaluation value, as the estimation result.

(7) The image processing apparatus according to any one of (1) to (6), in which the similarity evaluation unit sets a virtual posture of the projection unit or the imaging unit or virtual postures of both of the projection unit and the imaging unit, generates the simulation image obtained at the virtual posture, and evaluates the similarity between the captured image and the simulation image.

(8) The image processing apparatus according to any one of (1) to (7), in which the similarity evaluation unit generates the simulation image with a luminance value or a predetermined color component.

(9) The image processing apparatus according to any one of (1) to (8), in which the similarity evaluation unit evaluates the similarity between a reduced image of the captured image and the simulation image.

(10) The image processing apparatus according to any one of (1) to (9), in which the similarity evaluation unit evaluates the similarity between a partial image in a predetermined range that is an object to be processed, of the captured image, and the simulation image.

(11) The image processing apparatus according to any one of (1) to (10), in which the similarity evaluation unit repeats evaluation of the similarity a plurality of times.

(12) The image processing apparatus according to any one of (1) to (11), in which the similarity evaluation unit evaluates the similarity of each time, making a resolution of the captured image, or a range of a partial image that is an object to be processed in the captured image variable.

(13) The image processing apparatus according to any one of (1) to (12), further including:

a corresponding point distance evaluation unit configured to obtain corresponding points between the captured image and the simulation image, and evaluate a distance between the corresponding points between the captured image and the simulation image.

(14) The image processing apparatus according to any one of (1) to (13), in which both of the evaluation of the distance between the corresponding points by the corresponding point distance evaluation unit and the evaluation of the similarity by the similarity evaluation unit are performed, and the posture setting unit sets the posture of the projection unit or the imaging unit or the postures of both of the projection unit and the imaging unit as the estimation result on the basis of both of an evaluation result of the distance between the corresponding points by the corresponding point distance evaluation unit and the evaluation result of the similarity by the similarity evaluation unit.

(15) The image processing apparatus according to any one of (1) to (14), in which
either the evaluation of the distance between the corresponding points by the corresponding point distance evaluation unit or the evaluation of the similarity by the similarity evaluation unit is performed, and
the posture setting unit sets the posture of the projection unit or the imaging unit or the postures of both of the projection unit and the imaging unit as the estimation result on the basis of an evaluation result of the distance between the corresponding points by the corresponding point distance evaluation unit or the evaluation result of the similarity by the similarity evaluation unit.

(16) The image processing apparatus according to any one of (1) to (15), in which
the similarity evaluation unit evaluates the similarity between the captured image and the simulation image between each of a plurality of the projection units and each of a plurality of the imaging units, and
the posture setting unit sets the postures of the plurality of projection units or the plurality of imaging units, or the postures of both of the plurality of projection units and the plurality of imaging units, as the estimation result, on the basis of evaluation results of the similarity between each of the projection units and each of the imaging units by the similarity evaluation unit.

(17) The image processing apparatus according to any one of (1) to (16), further including:
a setting unit configured to perform setting regarding geometric correction of the projected image on the basis of the posture set by the posture setting unit.

(18) The image processing apparatus according to any one of (1) to (17), further including:
the projection unit configured to project the projected image.

(19) The image processing apparatus according to any one of (1) to (18), further including:
the imaging unit configured to capture the projected image to obtain the captured image.

(20) An image processing method including: evaluating similarity between a captured image obtained by imaging a projected image by an imaging unit, the projected image having been projected by a projection unit, and a simulation image simulating a captured image supposed to be obtained by imaging a projected image by the imaging unit, the projected image having been projected by the projection unit; and
setting a posture of the projection unit or the imaging unit or postures of both of the projection unit and the imaging unit on the basis of an evaluation result of the similarity.

REFERENCE SIGNS LIST

100 Projection imaging system
101 Control device
102 Projection imaging device
111 Projection unit
112 Imaging unit
151 Projection processing unit
152 Projection control unit
153 Imaging control unit
154 Posture estimation unit
155 Setting unit
161 Similarity evaluation unit
162 Posture setting unit
171 Virtual posture setting unit
172 Simulation image generation unit
173 Image similarity evaluation unit
201 Control unit
301 Corresponding point distance evaluation unit
400 Projection imaging system
401 Network
410 Projection imaging system
411 Projection device
412 Imaging device
420 Projection imaging system
421 Projection imaging device
423 Control unit
430 Projection imaging device

The invention claimed is:
1. An image processing apparatus, comprising:
circuitry configured to:
evaluate a similarity between a captured image and a simulation image, wherein
the captured image is captured by an imaging operation of a projected image,
the captured image is captured by a camera,
the projected image is projected by a projector, and
the simulation image is obtained by simulation of an image obtained by the imaging operation of the projected image;
obtain corresponding points in the captured image and the simulation image;
evaluate a distance between the corresponding points in the captured image and the simulation image; and
set a posture of at least one of the projector or the camera as an estimation result, based on an evaluation result of the evaluated similarity and an evaluation result of the evaluated distance between the corresponding points.
2. The image processing apparatus according to claim 1, wherein
the circuitry is further configured to set postures of both of the projector and the camera as the estimation result, and
the postures have an optimum similarity evaluated based on a plurality of simulation images and the captured image.
3. The image processing apparatus according to claim 2, wherein the circuitry is further configured to:
obtain a sum of differences in absolute values of luminance values of a plurality of pixels between the simulation image and the captured image, as an evaluation value indicating the evaluated similarity; and
set the posture of the at least one of the projector or the camera based on a minimum evaluation value, as the estimation result.
4. The image processing apparatus according to claim 2, wherein the circuitry is further configured to:
obtain a sum of squares of differences in luminance values of a plurality of pixels between the simulation image and the captured image, as an evaluation value indicating the evaluated similarity; and
set the posture of the at least one of the projector or the camera based on a minimum evaluation value, as the estimation result.
5. The image processing apparatus according to claim 2, wherein the circuitry is further configured to:

obtain normalized cross-correlation between the simulation image and the captured image, as an evaluation value indicating the evaluated similarity; and set the posture of the at least one of the projector or the camera based on a maximum evaluation value, as the estimation result.

6. The image processing apparatus according to claim 2, wherein the circuitry is further configured to:

obtain zero-mean normalized cross-correlation between the simulation image and the captured image, as an evaluation value indicating the evaluated similarity; and set the posture of the at least one of the projector or the camera based on a maximum evaluation value, as the estimation result.

7. The image processing apparatus according to claim 1, wherein the circuitry is further configured to:

set a virtual posture of the at least one of the projector or the camera; and generate the simulation image obtained at the virtual posture.

8. The image processing apparatus according to claim 7, wherein the circuitry is further configured to generate the simulation image with one of a luminance value or a specific color component.

9. The image processing apparatus according to claim 1, wherein the circuitry is further configured to evaluate the similarity between a reduced image of the captured image and a reduced image of the simulation image.

10. The image processing apparatus according to claim 1, wherein the circuitry is further configured to evaluate the similarity between a simulation image and a partial image of the captured image, and the partial image, in a specific range of the captured image, comprises an image of an object.

11. The image processing apparatus according to claim 1, wherein the circuitry is further configured to repeat the evaluation of the similarity a plurality of times.

12. The image processing apparatus according to claim 11, wherein the circuitry is further configured to repeat the evaluation of the similarity the plurality of times based on one of a resolution of the captured image or a range of a partial image, the partial image, in the captured image, comprises an image of an object, and the resolution of the captured image and the range of the partial image are variable at each time of the plurality of times.

13. The image processing apparatus according to claim 1, wherein the circuitry is further configured to:

evaluate the similarity between the captured image and the simulation image between each of a plurality of projectors and each of a plurality of cameras; and set a plurality of postures of the plurality of projectors or the plurality of cameras, based on a plurality of evaluation results of the similarity between each of the plurality of projectors and each of the plurality of cameras.

14. The image processing apparatus according to claim 1, the circuitry is further configured to perform setting process regarding geometric correction of the projected image, based on the set posture.

15. The image processing apparatus according to claim 1, further comprising the projector configured to project the projected image.

16. The image processing apparatus according to claim 1, further comprising:

the camera configured to capture the projected image.

17. An image processing method, comprising:

evaluating a similarity between a captured image and a simulation image, wherein the captured image is captured by an imaging operation of a projected image, the captured image is captured by a camera, the projected image is projected by a projector, and the simulation image is obtained by simulation of an image obtained by the imaging operation of the projected image;

obtaining corresponding points in the captured image and the simulation image;

evaluating a distance between the corresponding points in the captured image and the simulation image;

setting a posture of at least one of the projector or the camera as an estimation result, based on an evaluation result of the evaluated similarity and an evaluation result of the evaluated distance between the corresponding points; and setting geometric correction of the projected image, based on the set posture.

18. An image processing apparatus, comprising:

circuitry configured to:

evaluate a similarity between a captured image and a simulation image, wherein the captured image is captured by an imaging operation of a projected image, the captured image is captured by a camera, the projected image is projected by a projector, and the simulation image is obtained by simulation of an image obtained by the imaging operation of the projected image;

repeat the evaluation of the similarity a plurality of times based on one of a resolution of the captured image or a range of a partial image, wherein the partial image, in the captured image, comprises an image of an object, and the resolution of the captured image and the range of the partial image are variable at each time of the plurality of times; and set a posture of at least one of the projector or the camera as an estimation result, based on an evaluation result of the repeated evaluation of the similarity.

* * * * *